(12) United States Patent
Tulino et al.

(10) Patent No.: US 10,193,947 B2
(45) Date of Patent: Jan. 29, 2019

(54) DEVICES AND METHODS FOR CONTENT DISTRIBUTION IN A COMMUNICATIONS NETWORK

(71) Applicants: Antonia Tulino, Red Bank, NJ (US); Jaime Llorca, Red Bank, NJ (US)

(72) Inventors: Antonia Tulino, Red Bank, NJ (US); Jaime Llorca, Red Bank, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 150 days.

(21) Appl. No.: 15/003,142

(22) Filed: Jan. 21, 2016

(65) Prior Publication Data

US 2016/0226735 A1     Aug. 4, 2016

Related U.S. Application Data

(60) Provisional application No. 62/110,121, filed on Jan. 30, 2015.

(51) Int. Cl.
*H04L 29/08*     (2006.01)

(52) U.S. Cl.
CPC .............. *H04L 67/00* (2013.01); *H04L 67/06* (2013.01); *H04L 67/2861* (2013.01); *H04L 67/36* (2013.01)

(58) Field of Classification Search
CPC ..... H04L 67/00; H04L 67/06; H04L 67/2861; H04L 67/36; H04N 21/6405; H04N 21/64322; H04N 21/26616; H04N 21/6125; H04N 21/4384; H04N 21/44209; H04W 4/06
See application file for complete search history.

(56) References Cited

U.S. PATENT DOCUMENTS

2017/0134120 A1\*    5/2017   Calabro ............... H04B 10/548

OTHER PUBLICATIONS

Xiao et al, Systematic binary deterministic rateless codes, Aug. 8, 2008, IEE, 2008 IEEE International Symposium on Information Theory.\*
Youcef Saad Martin H.Schultz, Data communication in hypercubes, Feb. 1989, Journal of Parallel and Distributed Computing vol. 6, Issue 1 pp. 115-135.\*

(Continued)

*Primary Examiner* — Chris Parry
*Assistant Examiner* — Abderrahmen Chouat
(74) *Attorney, Agent, or Firm* — Harness, Dickey & Pierce, P.L.C.

(57) ABSTRACT

At least one example embodiment provides a method for transmitting data files in a network. The method may include receiving requests from destination devices for packets of the data files. The method may include constructing a conflict graph such that each packet requested by each destination device is represented by a distinct vertex in a plurality of vertices of the conflict graph. The method may include coloring the plurality of vertices of the conflict graph according to a coloring scheme. The method may include performing a first encoding operation on the requested packets based on the coloring to generate first encoded data. The method may include performing a second encoding operation on the first encoded data to generate second encoded data. The method may include sending the second encoded data.

10 Claims, 21 Drawing Sheets

(56) References Cited

OTHER PUBLICATIONS

Gao et al. Network Coding Based Schemes for Imperfect Wireless Packet Retransmission Problems: A Divide and Conquer Approach, Feb. 2012, Springer, Wireless personal communications, vol. 62, Issue 4, pp. 937-958.*

Chaudhry et al. Efficient algorithms for Index Coding, Jun. 17 2008, IEEE, INFOCOM Workshops 2008, IEEE.*

Ming Xiao, Efficient Coding Techniques for Networks & Channels with Transmission Errors, 2007, Department of Computer Science and Engineering Chalmers University of Technology Goteborg, Sweden 2007 (Year: 2007).*

* cited by examiner $A_2, B_2, C_2$ = Black
$B_3, C_3$ = Red
$A_4, B_4$ = Blue
$A_3$ = Brown
$C_4$ = Purple Adj(i) = (j,k,x,y):
C = 0:
c = yellow:

Adj(i) = (j,k,x,y):
C = {yellow, blue}
c = yellow:

Adj(i) = (j,k,x,y):
C = (blue, green, red, gray):
c = yellow:

Adj(i) = (j,k,x,y):
C = (blue, green, red, gray):
c = blue:

DEVICES AND METHODS FOR CONTENT DISTRIBUTION IN A COMMUNICATIONS NETWORK

CROSS REFERENCE TO RELATED APPLICATIONS

This application is a non-provisional application that claims priority to U.S. provisional App. No. 62/110,121, filed on Jan. 30, 2015, the entire content of which is incorporated by reference in its entirety.

BACKGROUND

Currently, content distribution networks (CDNs) face capacity and efficiency issues associated with the increase in popularity of on-demand audio/video streaming. One way to address these issues is through network caching and network coding. For example, conventional content distribution network (CDN) solutions employ centralized algorithms for the placement of content copies among caching locations within the network. Conventional solutions also include cache replacement policies such as LRU (least recently used) or LFU (least frequently used) to locally manage distributed caches in order to improve cache hit ratios. Other conventional solutions use random linear network coding to transfer packets in groups, which may improve throughput in capacity-limited networks.

However, conventional network caching and network coding solutions do not consider the relative efficiency of caching and transmission resources. This leads to suboptimal cost per delivered object or file. Moreover, conventional content delivery solutions do not exploit the possible combined benefits of network caching and network coding.

SUMMARY

According to at least one example embodiment, a method for transmitting data files in a network includes receiving requests from destination devices for packets of the data files. The method includes constructing a conflict graph such that each packet requested by each destination device is represented by a distinct vertex in a plurality of vertices of the conflict graph. The method includes coloring the plurality of vertices of the conflict graph according to a coloring scheme. The method includes performing a first encoding operation on the requested packets based on the coloring to generate first encoded data. The method includes performing a second encoding operation on the first encoded data to generate second encoded data. The method includes sending the second encoded data.

According to at least one example embodiment, the performing a first encoding operation includes combining packets represented by vertices having a same color to generate the first encoded data.

According to at least one example embodiment, the constructing constructs an undirected conflict graph.

According to at leas one example embodiment, the constructing constructs a directed conflict graph.

According to at least one example embodiment, the network is a combination network, the first encoding operation reduces a total load on the network, and the second encoding operation distributes the total load evenly over links of the combination network.

According to at least one example embodiment, the performing a second encoding operation includes combining bits of the first encoded data according to a binary encoding method.

According to at least one example embodiment, the binary encoding method includes grouping bits of the first encoded data into a desired number of blocks having an equal number of bits in each block. The binary encoding method includes padding each of the blocks with a '0.' The binary encoding method includes performing a desired number of shifting operations on bits of each of the padded blocks to generate shifted blocks. The binary encoding method includes removing a last bit from each of the shifted blocks to generate resultant blocks. The binary encoding method includes combining the resultant blocks to generate the second encoded data.

According to at least one example embodiment, the grouping includes selecting the desired number of blocks based on a number of links from intermediate nodes incoming to the destination devices, the intermediate nodes connecting a source of the data files to the destination devices.

According to at least one example embodiment, the performing a desired number of shifting operations includes selecting the desired number of shifting operations for each of the padded blocks based on a number of links from intermediate nodes incoming to the destination devices and a number the intermediate nodes, the intermediate nodes connecting a source of the data files to the destination devices.

According to at least one example embodiment, a device for transmitting data files in a network includes a receiver configured to receive requests from destination devices for packets of the data files. The device includes a memory including instructions stored thereon. The devices includes a processor configured to execute the instructions stored on the memory to construct a conflict graph such that each packet requested by each destination is represented by a distinct vertex in a plurality of vertices of the conflict graph, color the plurality of vertices of the conflict graph according to a coloring scheme, perform a first encoding operation on the requested packets based on the coloring to generate first encoded data, and perform a second encoding operation on the first encoded data to generate second encoded data. The device includes a transmitter configured to send the second encoded data.

According to at least one example embodiment, the processor is configured to execute the instructions stored on the memory to perform the first encoding operation by combining packets represented by vertices having a same color to generate the first encoded data.

According to at least one example embodiment, the processor is configured to execute the instructions stored on the memory to construct the conflict graph as an undirected conflict graph.

According to at least one example embodiment, the processor is configured to execute the instructions stored on the memory to construct the conflict graph as a directed conflict graph.

According to at least one example embodiment, the network is a combination network, the first encoding operation reduces a total load on the network, and the second encoding operation distributes the total load evenly over links of the combination network.

According to at least one example embodiment, the processor is configured to execute the instructions stored on the memory to perform the second encoding operation by combining bits of the first encoded data according to a binary encoding method.

According to at least one example embodiment, the processor is configured to execute the instructions stored on the memory to perform the binary encoding method by grouping bits of the first encoded data into a desired number of blocks having an equal number of bits in each block, padding each of the blocks with a '0', performing a desired number of shifting operations on bits of each of the padded blocks to generate shifted blocks, removing a last bit from each of the shifted blocks to generate resultant blocks, and combining the resultant blocks to generate the second encoded data.

According to at least one example embodiment, the processor is configured to execute the instructions stored on the memory to select the desired number of blocks based on a number of links from intermediate nodes incoming to the destination devices, the intermediate nodes connecting a source of the data files to the destination devices.

According to at least one example embodiment, the processor is configured to execute the instructions stored on the memory to select the desired number of shifting operations for each of the padded blocks based on a number of links from intermediate nodes incoming to the destination devices and a number the intermediate nodes, the intermediate nodes connecting a source of the data files to the destination devices.

According to at least one example embodiment, a method for transmitting data files in a network includes receiving requests from destination devices for packets of the data files, at least some of the requested packets being stored at the destination devices. The method includes performing a first encoding operation on the requested packets to compress the requested packets into first encoded data. The method includes performing a second encoding operation on the first encoded data to generate second encoded data. The method includes sending the second encoded data.

According to at least one example embodiment, the performing a second encoding operation performs a network coding operation.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Figure 1:
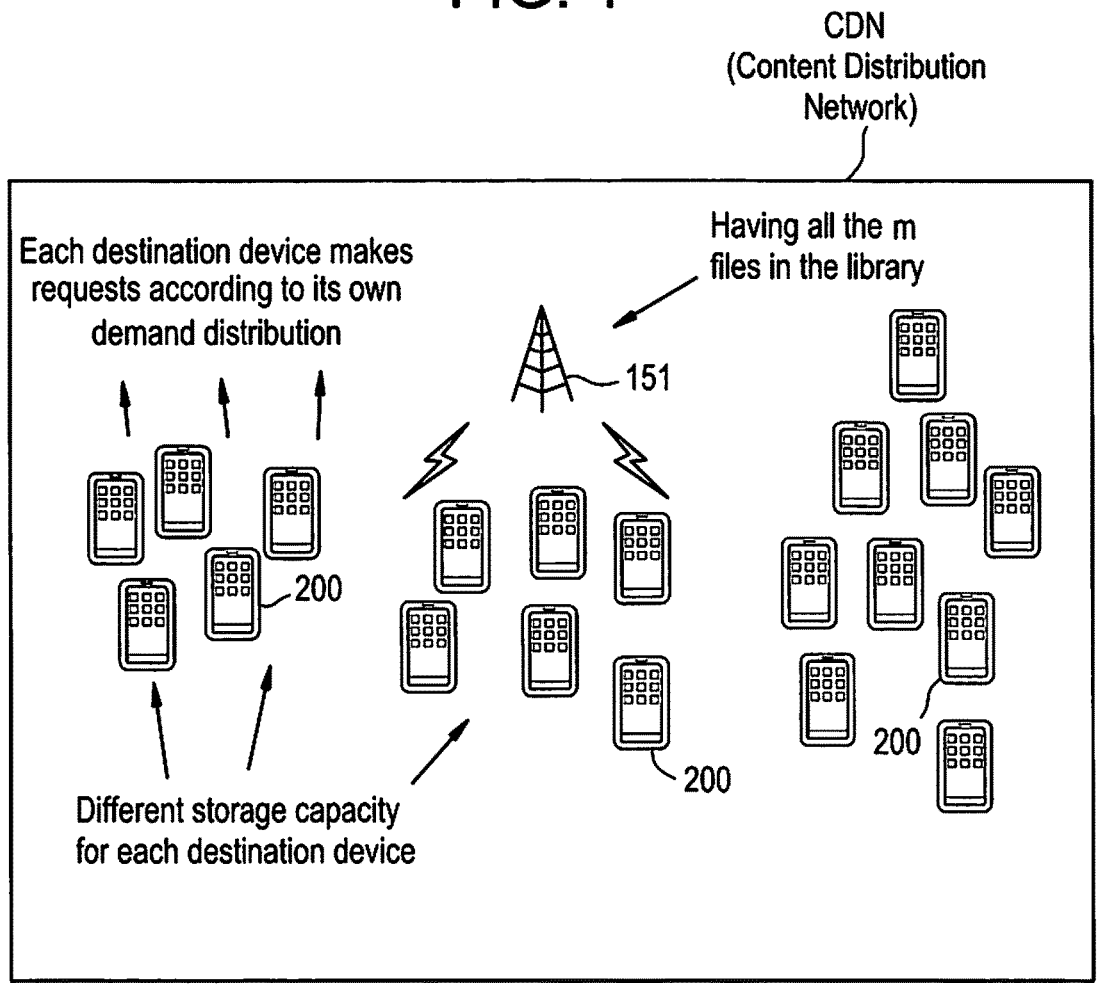
FIG. 1 shows a content distribution network according to at least one example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processors (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a special purpose processor or special purpose processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 shows a content distribution network according to at least one example embodiment.

As shown in FIG. 1, a content distribution network (CDN) may include the network element 151 connected to a plurality of destination devices 200. The network element 151 may be a content source (e.g., a multicast source) for distributing data files (e.g., movie files). The destination devices 200 may be end user devices requesting data from the content source. For example, each destination device 200 may be part of or associated with a device that allows for the user to access the requested data. For example, each destination device 200 may be a set top box, a personal computer, a tablet, a mobile phone, or any other device associated used for streaming audio and video. Accordingly, the CDN may be a wired and/or wireless network. Each of the destination devices 200 may include a memory for storing data received from the network element 151. The structure and operation of the network element 151 and destination devices 200 will be described in more detail below with reference to FIGS. 2 and 3.

Figure 2:
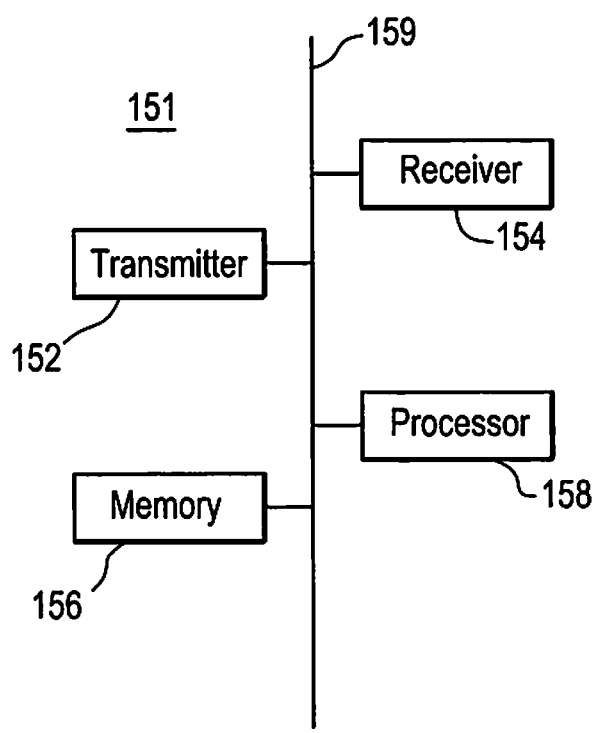
FIG. 2 is a diagram illustrating an example structure of network element according to an example embodiment.

FIG. 2 is a diagram illustrating an example structure of network element according to an example embodiment. According to at least one example embodiment, the network element 151 may be configured for use in a communications network (e.g., the content distribution network (CDN) of FIG. 1). Referring to FIG. 2, the network element 151 may include, for example, a data bus 159, a transmitter 152, a receiver 154, a memory 156, and a processor 158. Although a separate description is not included here for the sake of brevity, it should be understood that each destination device 200 may have the same or similar structure as the network element 151.

The transmitter 152, receiver 154, memory 156, and processor 158 may send data to and/or receive data from one another using the data bus 159. The transmitter 152 is a device that includes hardware and any necessary software for transmitting wireless signals including, for example, data signals, control signals, and signal strength/quality information via one or more wireless connections to other network elements in a communications network.

The receiver 154 is a device that includes hardware and any necessary software for receiving wireless signals including, for example, data signals, control signals, and signal strength/quality information via one or more wireless connections to other network elements in a communications network.

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code. For example, it should be understood that the modifications and methods described below may be stored on the memory 156 and implemented by the processor 158 within network element 151.

Further, it should be understood that the below modifications and methods may be carried out by one or more of the above described elements of the network element 151. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

It should be understood that example embodiments are directed to a caching phase (described below with reference to FIGS. 3A and 3B) and a delivery phase (described below with reference to FIGS. 4-8).

FIGS. 3-8 are flow charts illustrating example operations of the network element in FIG. 2. For example, FIGS. 3A-3B show example operations for carrying out a method of caching in a communications network. FIGS. 4-8 show example operations for delivering data files after the caching method has been performed.

Figure 3A:
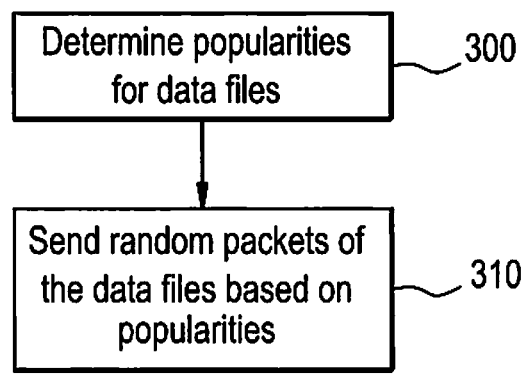
FIGS. 3A-3B are flow charts illustrating example operations of the network element in FIG. 2.
Figure 3B:
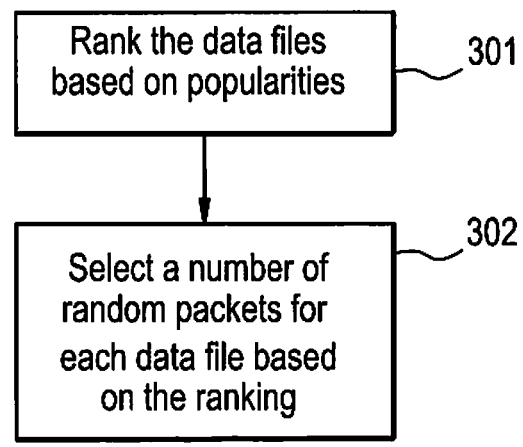

It should be understood that FIGS. 3A-3B are for carrying out a caching distribution method related to Algorithm 1 below, where each data file 'f' is divided into 'B' equal-size packets represented as symbols of a finite field and belongs to library 'F':

---
Algorithm 1: Caching algorithm 1  for f ∈ F →
2      Each user u caches a subset of
       $p_{f,u}M_uB$ distinct packets of file f
       uniformly at random;
3  endfor
4      M = {$M_{u,f}$, with u = 1,...,n, and f = 1,...,m};
5  return( M );
end Caching algorithm
---

In Algorithm 1, '$p_u = [p_{u,1}, \ldots p_{u,m}]$' is the caching distribution of the 'u' destination device 200, where $$\sum_{f=1}^{m} p_{f,u} = 1, \forall u \text{ with } u = 1, \ldots, n,$$

$$\text{and } 0 \leq p_{f,u} \leq 1/M_u, \forall f = 1, \ldots, m, u = 1, \ldots, n,$$

'm' is the number of files hosted by the network element 151, and '$M_u$' is the storage capacity of the cache at destination device 'u' (i.e., destination device 200) and $M_{u,f} = p_{f,u}M_uB$ denotes the packets of file cached at user u. The network element 151 carries out Algorithm 1 such that destination, 'u', device 200 caches $M_{u,f} = p_{f,u}M_uB$ packets of file 'f'. Furthermore, the randomized nature of Algorithm 1 allows network element 151 to perform operations such that, if two destinations caches the same number of packets for a given file 'f', then each of the two destination device 200 caches different packets of the same file 'f'. Algorithm 1 may be implemented by network element 151 according to the operations described in FIGS. 3A-3B below.

Referring to FIG. 3A, in operation 300, the network element 151 may determine popularities for a plurality of data files. The data files may be, for example, video and/or audio files. The network element 151 may determine the popularities based on requests for the plurality of data files from at least one of destination devices 200 (e.g., user requests). The user requests may form a demand distribution for the data files. The network element 151 may determine the popularities according to a demand distribution of all the destination devices 200. In this case, the demand distribution may follow a Zipf distribution. Alternatively, the network element 151 may determine the popularities on a per destination device basis where each destination device 200 has as associated demand distribution.

The network element 151 may determine the popularities based on a number of requests for the data files from the destination devices 200. For example, the network element 151 determines a data file that is requested 100 times by the destination devices 200 as having a higher popularity than a data file that is requested 50 times. Thus, the popularities may be based on which data files are most often requested and viewed by users of the destination devices 200.

The network element 151 may divide each data file into a plurality of packets. For example, the network element 151 may divide each data file in to a same number of packets (e.g., three packets). Accordingly, in operation 310, the network element 151 may send random packets of the plurality of data files to at least one destination device based on the popularities determined in operation 300. For example, the network element 151 may send random packets of each data file to destination devices 200 such that the random packets are stored (or cached) at each destination device 200.

The network element 151 may send the random packets such that each destination device 200 receives a given number of random packets for at least one of the data files based on the determined popularities and input parameters (e.g., number of destination devices, popularity distribution, cache size of each destination device, size of the data file library at network element 151, etc.). For example, the network element 151 may send a same number of packets to each destination device 200 if the destination devices 200 have a same size cache and a same demand distribution (e.g., the destination devices are homogeneous). In one example, assume that there are two destination devices 1 and 2 and two files A and B, divided into ten packets. If (i) destination devices 1 and 2 request file A and file B with the same frequency and file A is requested by both destinations with more frequency than file B, and (ii) the two destination devices 1 and 2 have the same cache size, for example six units in terms of packets, then the network element 151 will perform the caching method such that both destination devices 1 and 2 cache four packets of file A and two packets of file B.

If the network element 151 determined the popularities on a per destination device basis in operation 300, then the network element 151 may send the random packets on a per destination device basis in operation 310. For example, the network element 151 may send a different number of packets to each destination if the destinations devices 200 have different size caches or different demand distributions. In this case, referring to the example above, destination device 1 could receive seven packets of file A and three packets of file B while destination device 2 could receive two packets of file A and five packets of file B. This could be due the fact that destination device 1 requests file A much more than file B and has total cache size of ten units in terms of packets, while destination 2 device requests file A much less than file B and has a total cache size of seven units in terms of packets.

FIG. 3B illustrates example operations of the network element 151 that may be carried out between operations 300 and 310, if desired. For example, following operation 300 in FIG. 3A, the network element 151 may rank the data files based on the determined popularities. For example, in operation 301, the network element 151 may rank the data files from a most popular data file to a least popular data file using the popularities determined in operation 300.

In operation 302, the network element 151 may select, for each data file, a number of random packets based on the ranking. For example, the network element 151 selects a different number of random packets for each of the data files according at least one of a respective rank of each data file and input parameters of the network (e.g., number of destination devices, popularity distribution, cache size of each destination device, size of the data file library at network element 151, etc.). After operation 302, the network element 151 may proceed back to operation 310 in FIG. 3A to send the selected number of random packets for each data file.

It should be appreciated that operation 302 may include the network element 151 dividing the ranked data files into at least a first subset and a second subset based on at least one threshold value. The at least one threshold value may be based on empirical evidence and/or user defined. The first subset may contain higher ranked data files than the second subset. Thus, in operation 310, the network element 151 may send the selected number of random packets for only the data files in the first subset. This may allow for a more efficient caching of the packets at the destination devices 200.

It should be understood that the operations described with reference to FIGS. 3A and 3B allow for improved performance of the network because of the scheme's ability to cache more packets of the more popular files and increase (or alternatively, maximize) the amount of distinct packets of each file collectively cached by the destination devices 200.

In conjunction with the above described caching methods, this application discloses example methods for a delivery phase in which requested packets of data files are delivered to destination devices 200. Example methods for the delivery phase are based on graph theory.

Figure 4:
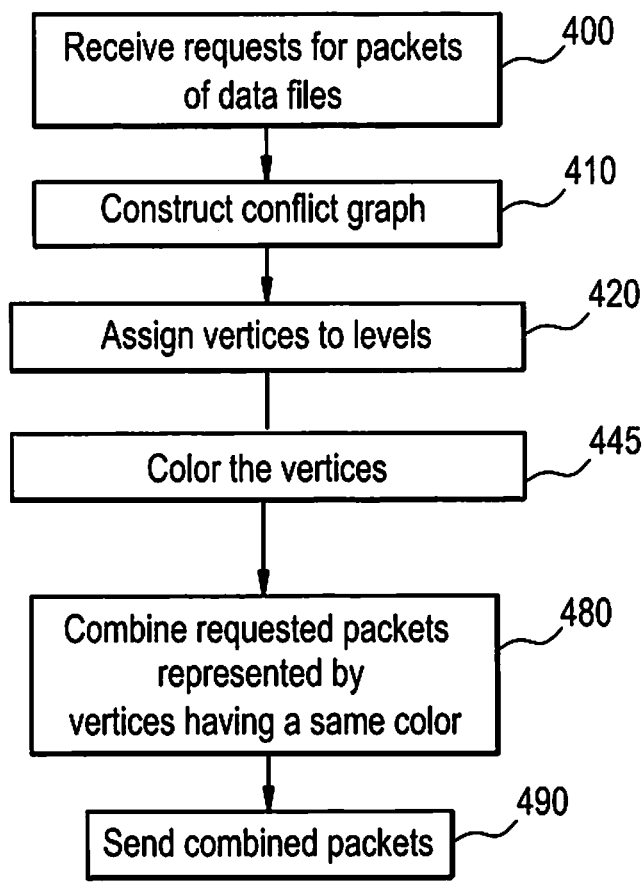
FIG. 4 illustrates example operations for a delivery phase according to at least one example embodiment.

FIG. 4 illustrates example operations for a delivery phase according to at least one example embodiment. With reference to FIG. 4, in operation 400, the network element 151 receives requests from destination devices 200 or user devices) for packets of the data files. Since the network element 151 has already performed the caching method described above, each destination device 200 requests only those packets that were not cached r stored as a result of the caching method. Thus, the delivery phase consists of providing to each destination device 200 the missing part(s) of the requested files, i.e., the packets missing from that destination device's 200 memory.

In operation 410, the network element 151 constructs a conflict graph. In general, a conflict graph is a mathematical structure including a set of vertices and a set of edges connecting the vertices. If two vertices are connected by an edge, it means that the vertices may conflict or interfere with each other. Within the context of the communications field, vertices may represent information units (e.g., packets of information). Conflicting vertices indicates that they cannot share the same resources (e.g., time, bandwidth, storage space, etc.). Conflict graphs are often used for solving scheduling problems (e.g., assigning resources to information units).

For exampe, in operation 410, the network element 151 populates a conflict graph with a plurality of vertices such that each packet requested by each destination device 200 is represented by a distinct vertex in a plurality of vertices of the conflict graph. Thus, even if a same packet is requested by K different users, the packet is represented as K different vertices in the conflict graph. Further, the network element 151 may construct the conflict graph based on which of the plurality of vertices represent a same requested packet and which requested packets are stored in caches belonging to the destination devices 200. Operation 410 is described in further detail below with reference to FIGS. 5 and 6.

Still referring to FIG. 4, in operation 420, the network element 151 may assign the plurality of vertices to levels. Each level may indicate a number of requests for packets and a number of user destination 200 caches storing the packets. For example, each level may be a sum of the number of user destinations requesting a packet and the number of user device caches storing the requested packet. Thus, if a packet is requested by 4 destinations devices 200 and 3 of the destinations devices 200 are storing the packet, then the level for the vertex associated with that packet is 3+4=7.

Figure 7A:
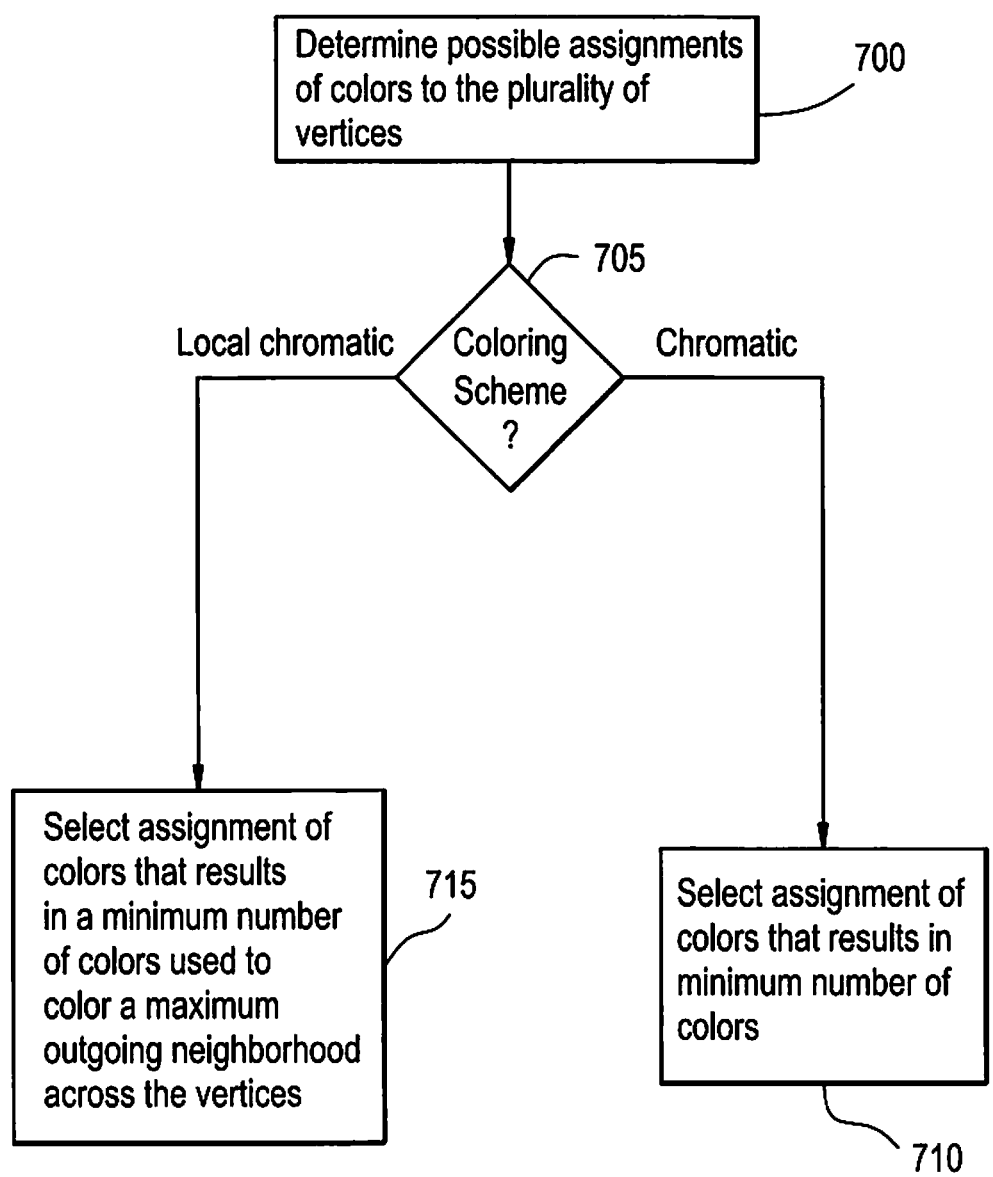
FIGS. 7A and 7B describe example operations for coloring a conflict graph according to at least one example embodiment.
Figure 7B:
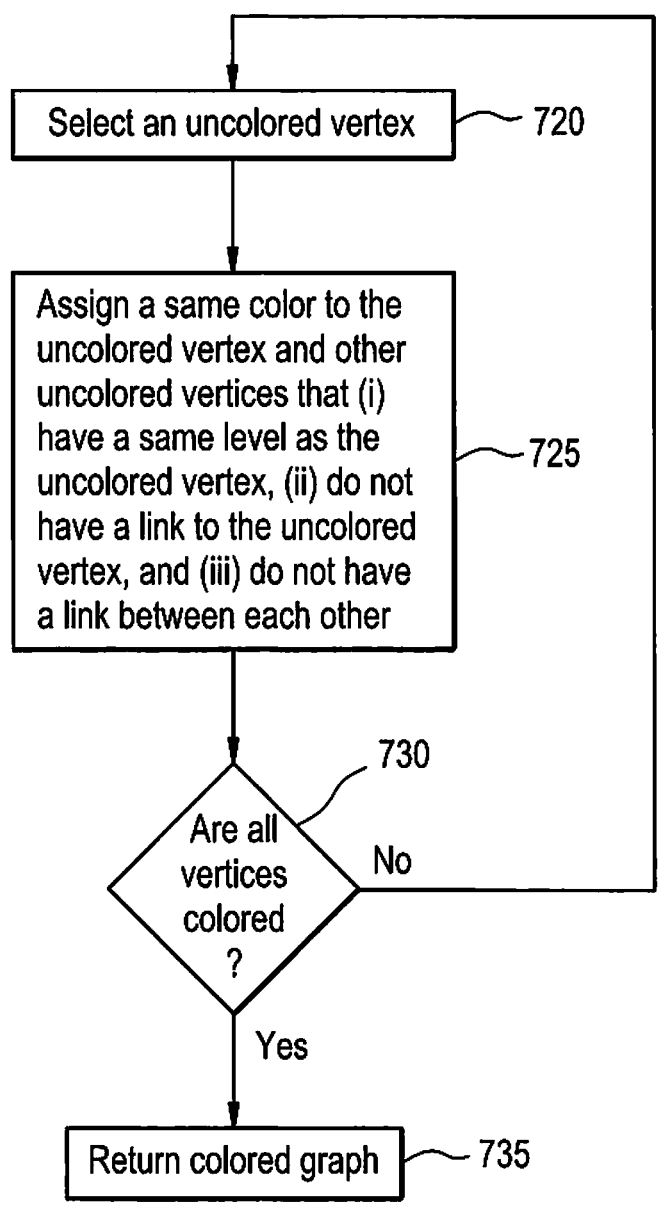

It should be understood that operation 420 is an optional operation in FIG. 4. For example, operation 420 may be performed or not performed based on how the network element 151 will perform the coloring operation in operation 445. For example, the network element 151 may perform operation 420 if the coloring operations of FIG. 7B are selected. The network element 151 will skip operation 420 if the coloring operations of FIG. 7A are selected.

Still referring to FIG. 4, in operation 445, the network element 151 colors the plurality of vertices as a way of labeling the requested packets on the conflict graph. Operation 445 is discussed in further detail below with respect to FIGS. 7A and 7B.

In operation 480, the network element 151 combines the requested packets represented by vertices having a same color. For example, the network element 151 performs an exclusive-OR operation (or other linear combination operation over a finite field) on the packets represented by the vertices having the same color. Operation 480 is discussed in further detail below with respect to FIG. 8.

In operation 490, the network element 151 sends the combined packets. For example, the network element 151 sends the combined packets to the destination devices 200 via a multicast transmission. By combining packets prior to transmission it should be understood that delivery methods according to at least one example embodiment may reduce the number of transmissions of the network element 151 which may reduce consumption and improve network efficiency.

Figure 5:
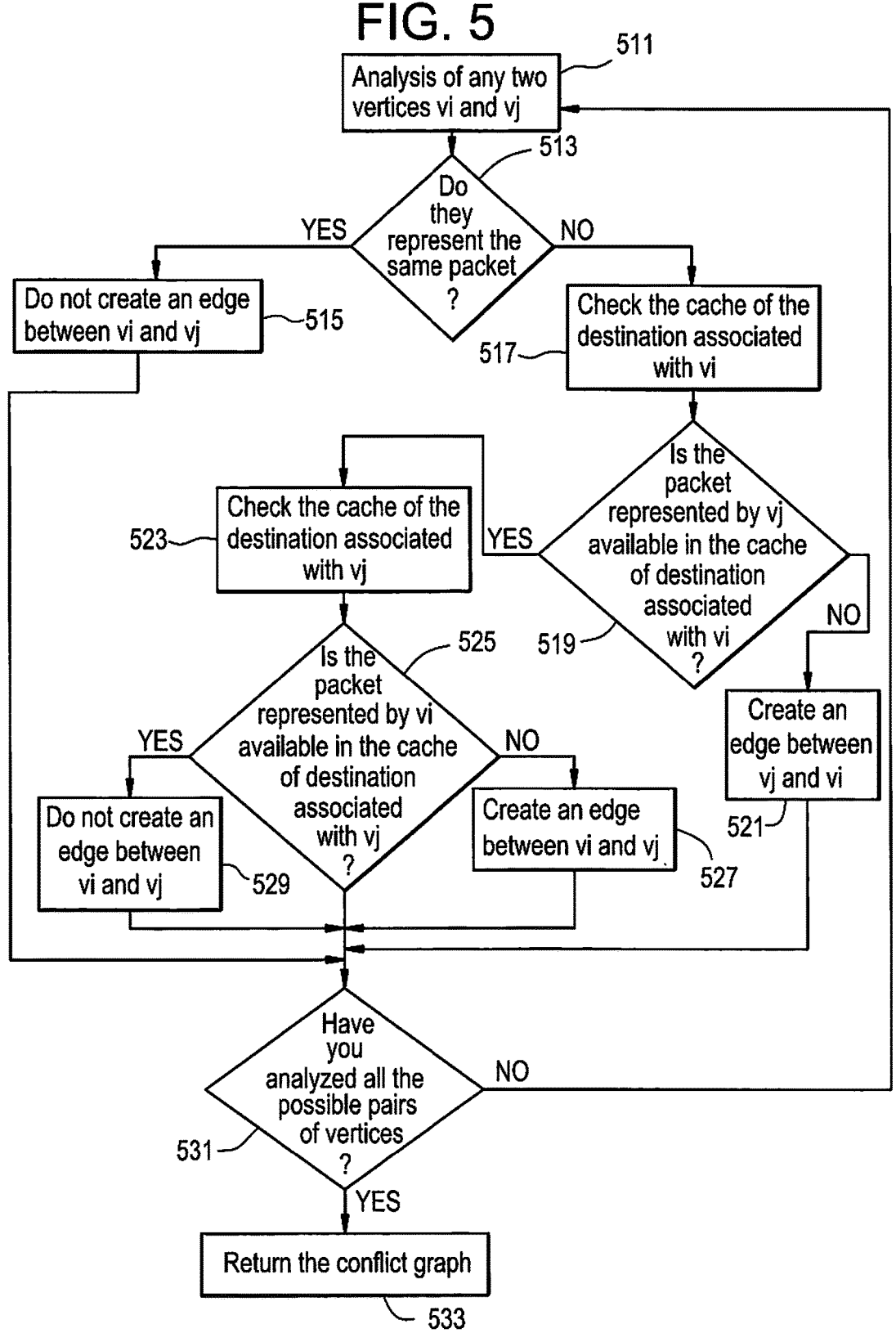
FIG. 5 illustrates example operations for constructing an undirected conflict graph according to at least one example embodiment.
Figure 6:
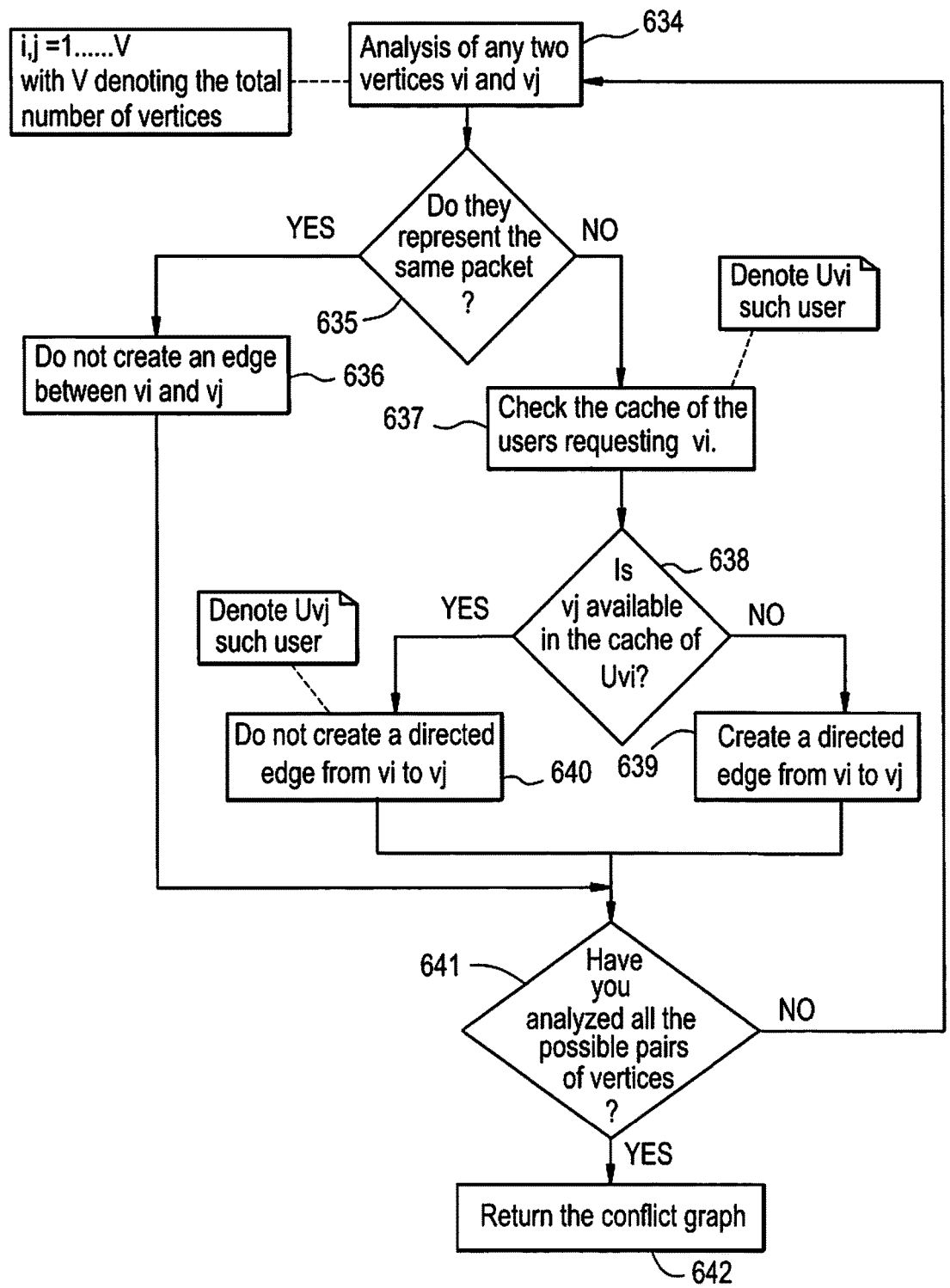
FIG. 6 illustrates example operations for constructing a directed conflict graph according to at least one example embodiment.

FIGS. 5 and 6 illustrate example operations for constructing a conflict graph according to at least one example embodiment. For example, FIGS. 5 and 6 discuss operation 410 from FIG. 4 in further detail. FIG. 5 illustrates example operations for constructing an undirected conflict graph while FIG. 6 illustrates example operations for constructing a directed conflict graph. A conflict graph may be considered undirected if the edges connecting the vertices do not have associated directions. For example, an undirected edge between two vertices representing two packets requested by two respective users indicates that the two packets interfere with each other (i.e., the packets cannot share the same resources). If the two packets are sent to the users sharing a same resource, then both users cannot successfully decode their requested packets. The undirected conflict graph may be used in conjunction with a coloring scheme referred to in this application as a chromatic number scheme and a coloring scheme referred to a greedy constrained (GCC) coloring scheme.

A conflict graph may be considered directed if the edges connecting a vertex to other vertices are directed toward the other vertices. For example, a directed edge from vertex 1 toward vertex 2 indicates that vertex 2 interferes with vertex. 1. If two packets represented by vertices 1 and 2 are sent to two respective users sharing a same resource, then the user requesting packet 2 will be able to decode the packet, but the user requesting packet 1 will not be able to decode the packet. The directed conflict graph may be used in conjunction with a coloring scheme referred to in this application as a local chromatic number scheme. These coloring schemes are described in more detail below with reference to FIGS. 7A and 7B.

Referring to FIG. 5, in operation 511, the network element 151 analyzes two vertices 'Vi' and 'Vj' from the plurality of vertices populated in operation 410. If, in operation 513, the network element determines that vertices Vi and Vj represent a same requested packet, then the network element 151 does not create a link (or edge) between the two vertices in operation 515. Then, the network element 151 proceeds to operation 531 to determine whether all of the vertices in the conflict graph have been analyzed.

If, in operation 513, the network element 151 determines that the vertices Vi and Vj do not represent a same requested packet, then the network element 151 proceeds to operation 517 and checks the cache (or memory) of the destination devices 200 that are requesting the packet represented by vertex Vi. If, in operation 519, the network element 151 determines that the packet representing vertex Vj is not available in the cache of the destination devices 200 requesting the packet represented by vertex Vi, then the network element 151 creates a link (or edge) between vertex Vi and vertex Vj in operation 521. Then, the network element 151 proceeds to operation 531 to determine whether all of the vertices in the conflict graph have been analyzed.

If, in operation 519, the network element 151 determines that the packet representing vertex Vj is available in the cache of the destination devices 200 requesting the packet represented by vertex Vi, then the network element 151 checks the cache of the destination devices 200 requesting the packet represented by vertex Vj in operation 523. If, in operation 525, the packet representing vertex Vi is not available in the cache of the destination devices 200 requesting the packet represented by the vertex Vj, then the network element 151 creates a link between vertices Vi and NJ in operation 527 before proceeding to operation 531 to determine whether all of the vertices in the conflict graph have been analyzed.

If, in operation 525, the network element 151 determines that the packet representing vertex Vi is available in the cache of the destination devices 200 requesting the packet represented by the vertex Vj, then the network element 151 does not create a link between vertices Vi and Vj in operation 529. Then, the network element 151 proceeds to operation 531 to determine whether all of the vertices in the conflict graph have been analyzed.

Once the network element 151 has analyzed all of the vertices in the conflict graph, then the network element 151 returns the constructed conflict graph in operation 533.

In view of FIG. 5, it should be understood that the constructing operation 410 in FIG. 4 may summarized by an operation of creating a link between a first and a second of the plurality of vertices if (i) the first and second vertices do not represent a same packet, and (ii) the packet represented by the first vertex is not stored in the cache of the user device requesting the packet represented by the second vertex, or the packet represented by the second vertex is not stored in a cache of a user device requesting the packet represented by the first vertex.

FIG. 6 illustrates example operations for constructing a directed conflict graph.

Referring to FIG. 6, in operation 634, the network element 151 analyzes two vertices 'Vi' and 'Vj" from the plurality of vertices populated in operation 410. If, in operation 635, the network element 151 determines that vertices Vi and Vj represent a same requested packet, then the network element 151 does not create a link (or edge) between the two vertices in operation 636 before proceeding to operation 641 to determine whether all of the vertices in the conflict graph have been analyzed.

If, in operation 635, the network element 151 determines that the vertices Vi and Vj do not represent a same requested packet, then the network element 151 proceeds to operation 637 and checks the cache (or memory) of the destination devices 200 that are requesting the packet represented by vertex Vi. If, in operation 638, the packet representing vertex Vj is not available in the cache of the destination devices 200 requesting the packet represented by vertex Vi, then the network element 151 creates a directed link from vertex Vi to vertex Vj in operation 639 before proceeding to operation 641 to determine whether all of the vertices in the conflict graph have been analyzed.

If, in operation 638, the packet representing vertex Vj is available in the cache of the destination devices 200 requesting the packet represented by vertex Vi, then the network element 151 does not create a directed link from vertex Vi to vertex Vj in operation 640.

In operation 641, the network element 151 determines whether all possible pairs have been analyzed and, if not, returns to operation 634. If so, then the network element returns the constructed, directed conflict graph in operation 642.

In view of FIG. 6, it should be understood that the constructing operation 410 in FIG. 4 may summarized by an operation that constructs a directed conflict graph by creating a directed link from a first vertex in the plurality of vertices to a second vertex in the plurality of vertices if (i) the first and second vertices do not represent a same packet, and (ii) the packet represented by the second vertex is not stored in the cache of the user device requesting the packet represented by the first vertex.

FIGS. 7A and 7B describe example operations for coloring a conflict graph according to at least one example embodiment. For example, FIGS. 7A and 7B describe operation 445 in FIG. 4 in more detail. For ease of reference, FIG. 7A illustrates two coloring schemes; a chromatic number coloring scheme and a local chromatic number coloring scheme. FIG. 7B illustrates a coloring scheme called greedy constrained coloring (GCC).

With reference to FIG. 7A, in operation 705, the network element 151 may determine possible assignments of colors to the plurality of vertices. For example, the network element 151 may determine each of the assignments of colors such that any two linked vertices do not have the same color. In operation 705, the network element 151 determines the coloring scheme to be used. The determination may be user defined and/or based on empirical evidence. If the network element 151 determines that the chromatic number coloring scheme should be used, then the network element 151 selects the assignment of colors that results in a minimum number of colors for the conflict graph in operation 710. For example, if the network element 151 determines that there are 3 possible assignments that have 4, 5, and 6 colors, respectively, then the network element 151 selects the assignment having 4 colors to color the conflict graph. The chromatic number coloring scheme utilizes the undirected conflict graph constructed according to FIG. 5.

If, in operation 705, the network element 151 determines that the coloring scheme is the local chromatic number coloring scheme, then the network element 151 selects the assignment of colors that results in a minimum number of colors used to color a maximum closed outgoing neighborhood across the plurality of vertices in Operation 715. The closed outgoing neighborhood of a particular vertex is defined as a subset of the plurality of vertices that are connected by a directed link from the particular vertex in the directed conflict graph. Thus, this coloring scheme utilizes the directed conflict graph constructed according to FIG. 6, For example, if three assignments have maximum closed outgoing neighborhoods of 4, 5, and 6, respectively, then the network element 151 selects the assignment having the maximum closed outing neighborhood of 4. Here, it should also be understood that the assignment having the maximum closed outgoing neighborhood is not necessarily the assignment with the fewest number of colors.

FIG. 7B illustrates example operations for coloring a conflict graph according to a GCC scheme. The GCC scheme may be performed in conjunction with operation 420 in FIG. 4 and the undirected conflict graph constructed according to FIG. 5. Recall that in operation 420, the network element 151 assigns the plurality of vertices to levels, where each level indicates a number of requests for packets and a number of user destinations 200 storing the packets. Thus, the network element may perform operation 445 by coloring the plurality of vertices based on the assigned levels.

An example algorithm for the GCC scheme is shown below.

--- algorithm $GCC_1$

1  Let V = V ;
2  Let C = ∅;
3  $c_1$ = ∅;
4  while V ≠ ∅
5      Pick an arbitrary vertex v in V. Let I = {v};
6      for all v' ∈ V/{v} →
7          if {There is no edge between v' and I} ∩
             {$K_{v'}$ = $K_v$ ∀$\tilde{v}$ ∈ I}
8              I = I∪ v';
9          endif
10     endfor
11     Color all the vertices in I by c ∉ C;
12     Let $c_1$[I] = c;
13     V = V\I;
14 endwhile
15 reture($c_1$);
end  $GCC_1$

---

V is the set of all vertices in the undirected conflict graph $K_v$ denotes the set of users that are either caching or requesting packet v. C is the set of colors used to color the conflict graph and $c_1$ is a vector containing the association between colors and vertices in the conflict graph.

Referring to FIG. 7B and the above algorithm, in operation 720, the network element 151 may select an uncolored vertex from the plurality of vertices of the conflict graph. In operation 725, the network element 151 may assign a same color to the first vertex and other uncolored vertices in the plurality of vertices that (i) have a same level as the first vertex, (ii) do not have a link to the first vertex, and (iii) do not have a link between each other.

In operation 730, the network element 151 determines whether all of the vertices have been colored. If not, then the network element 151 returns to operation 720 until the plurality of vertices are colored. Then, the network element 151 returns the colored conflict graph in operation 735.

Operation 480 from FIG. 4 will now be described in more detail. If the network element 151 colors the vertices using either the chromatic number coloring scheme or the GCC scheme have been performed in operation 445, then the network element 151 may execute operation 480 by performing an exclusive-OR operation (or other linear combination operation over a finite field) on the packets represented by the vertices having the same color. If the network element 151 colors the vertices using the local chromatic number coloring scheme, then the network element 151 may execute operation 480 in accordance with FIG. 8.

Figure 8:
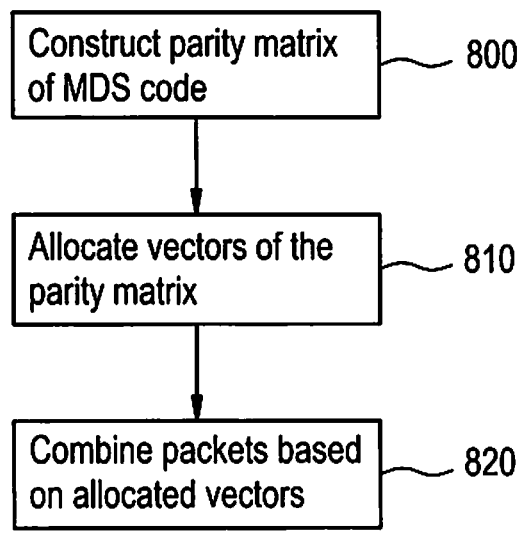
FIG. 8 shows example operations for combining packets according to at least one example embodiment.

FIG. 8 shows example operations for combining packets according to at least one example embodiment.

In operation 800, the network element 151 may construct a parity matrix of a maximum distance separable (MDS) code. For example, the network element 151 may construct the parity matrix of the MDS code based on a total number of colors in the selected assignment (e.g., from operation 715) and the number of colors in the maximum closed outgoing neighborhood across the plurality of vertices. For example, if a total of 6 colors are used to color the conflict graph, but the maximum number of colors locally at each vertex is 5, then the network element constructs a parity matrix V' of a (6, 5) MDS code.

In operation, 810, the network element 151 allocates vectors of the parity matrix based on the packets represented by the vertices having the same color. For example, the network element 151 allocates a same vector to vertices with a same color.

In operation 820, the network element 151 combines the packets represented by the vertices having the same color based on the allocated vectors.

The operations discussed above with respect to FIGS. 4-8 will now be described with respect to FIGS. 9 and 10.

Figure 9:
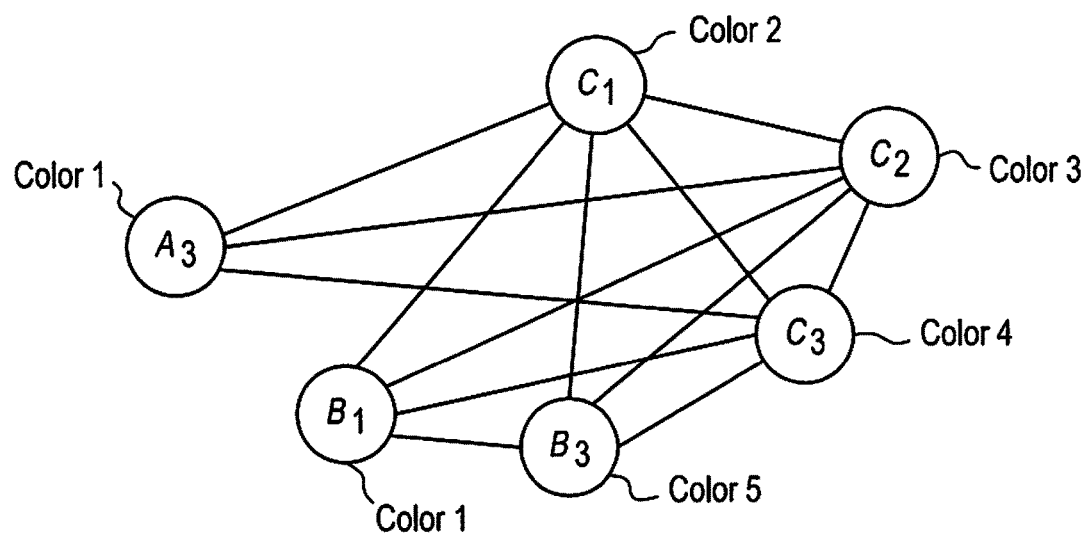
FIG. 9 illustrates a colored conflict graph according to at least one example embodiment.

FIG. 9 illustrates a colored conflict graph according to at least one example embodiment. For example, FIG. 9 shows an undirected conflict graph constructed according to FIG. 5 and colored according to the GCC scheme discussed with reference to FIG. 7B. Variables not defined in the description of FIG. 9 are defined in the description of Algorithm 1 above.

In FIG. 9, we consider a network with n=3 user destinations denoted as U={1, 2, 3} and m=3 data files denoted as F={A, B, C}. We assume M=1 and divide each file A, B, and C into three packets. For example, file A={$A_1$, $A_2$, $A_3$}. Let $p_{A,u}$=2/3, $p_{B,u}$=1/3 and $p_{C,u}$=0 for u∈{1, 2, 3}, which means that two packets of A, one packet of B and none of C will be stored in each user destination device's cache. We assume a caching realization M is given by: user destination device 1 caches {$A_1$, $A_2$, $B_1$} ($M_{1,A}$={$A_1$, $A_2$}, $M_{1,B}$={$B_1$}, $M_{1,C}$=∅); user destination device 2 caches {$A_1$, $A_3$, $B_2$}; user destination device 3 caches {$A_1$, $A_2$, $B_3$}. We let user destination device 1 request file A, user destination device 2 request file B, and user destination device 3 request file C (i.e., f={A, B, C}) such that the request function is W={$A_3$, $B_1$, $B_3$, $C_1$, $C_2$, $C_3$}. The resulting conflict graph is constructed according to FIG. 5 and shown in FIG. 9.

As shown in FIG. 9, each of the requested packets is represented by a vertex on the conflict graph, and linked with other vertices in the graph according to the operations set forth in FIG. 5. Using the GCC scheme described with reference to FIG. 7B, the vertices are colored with colors 1 to 5 (i.e., the set of vertices has 5 different colors). As shown in FIG. 9, vertex $A_3$ and vertex $B_1$ have a same color (i.e., color 1). Thus, in accordance with operation 480 in FIG. 4, the network element 151 combines the packets represented by vertices having a same color (i.e., vertex $A_3$ and vertex $B_1$) using, for example, a XOR operation (or by using a linear combination operation over a finite field) and sends the combined packets in operation 490. It should be understood that the vertex coloring in FIG. 9 is the minimum vertex coloring for this scenario and that the resultant number of packet transmissions is 5 because the packets represented by vertex $A_3$ and vertex $B_1$ are transmitted together. It should be further understood that a destination device 200 may decode the combined packets using a set of XOR operations (or a set of other linear combination operations). For example, the destination device 200 may decode combined packets using the packets stored in the cache of the destination device 200 (e.g., as keys).

Figure 10:
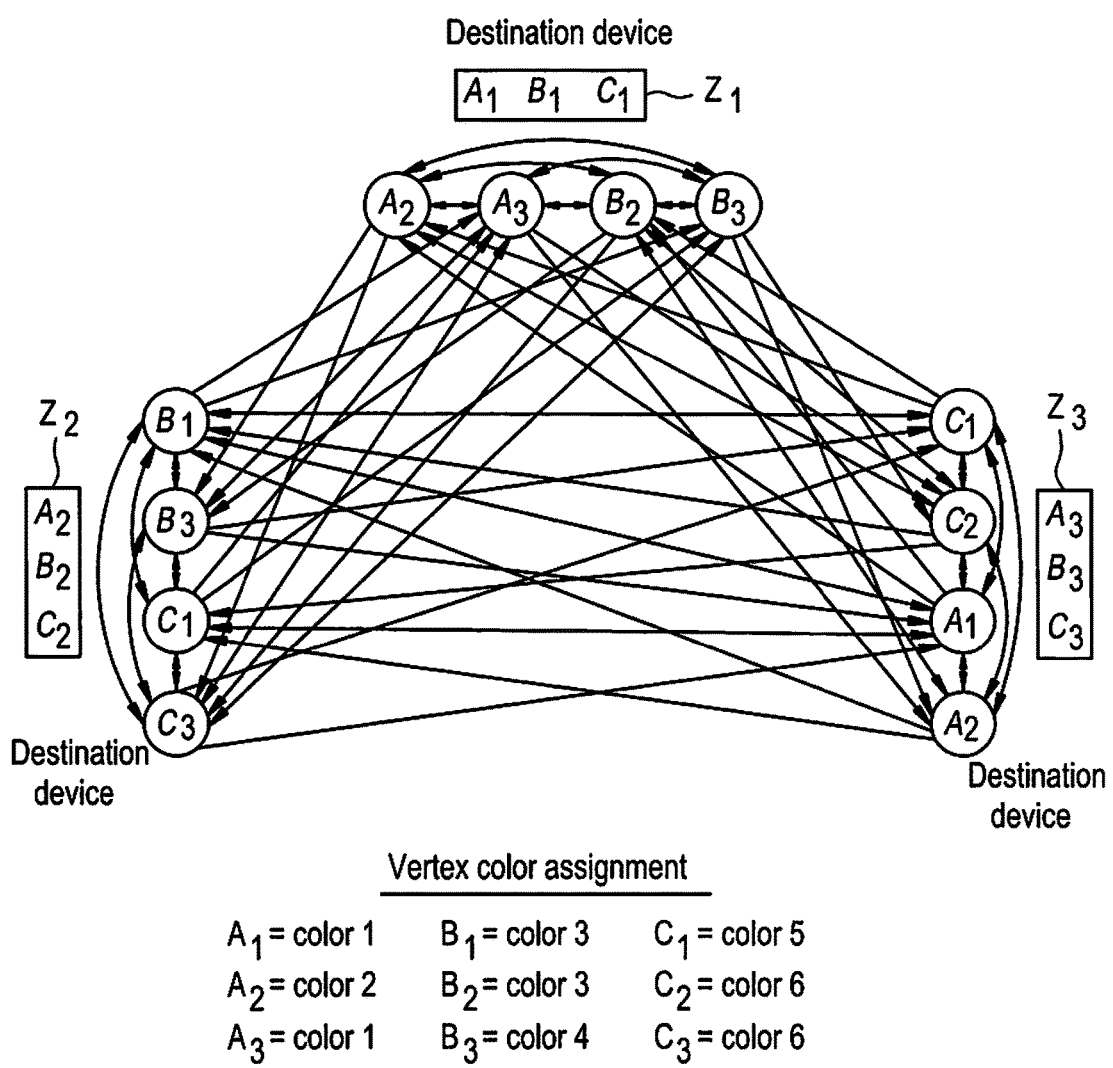
FIG. 10 illustrates a colored conflict graph according to at least one example embodiment.

FIG. 10 illustrates a colored conflict graph according to at least one example embodiment. For example, FIG. 10 shows a directed conflict graph constructed according to FIG. 6 and colored according to the local chromatic number scheme discussed with reference to FIG. 7A. Variables not defined in the description of FIG. 10 are defined in the description of Algorithm 1 and FIG. 9 above.

In FIG. 10, let m=n=3, M=1 and L=2, where L denotes the number of files requested by each user destination device. We denote the files as A, B, C. Each file is divided into $$\binom{3}{1} = 3 \text{ sub-packets},$$

i.e., A={$A_1$, $A_2$, $A_3$}, B={$B_1$, $B_2$, $B_3$} and C={$C_1$, $C_2$, $C_3$}. Then, the user destination device caches are given by: $Z_1$={$A_1$, $B_1$, $C_1$}, $Z_2$={$Z_2$, $B_2$, $C_2$}, $Z_3$={$A_3$, $B_3$, $C_3$}.

Let user destination device 1 request files A, B, user 2 request files B, C and user destination device 3 request files C, A. In this case, user destination device 1 requests sub-packets $A_2$, $A_3$, $B_2$, $B_3$. User destination device 2 requests sub-packets $B_1$, $B_3$, $C_1$, $C_3$. User destination device 3 requests sub-packets $C_1$, $C_2$, $A_1$, $A_2$. The resulting conflict graph $H^d$ and the corresponding vertex-coloring is shown in FIG. 10 where we can see that, in total, 6 colors are used but the closed outgoing neighborhood at each vertex is at most 5 colors (i.e., the maximum number of directed links from a particular vertex is 5).

After the conflict graph is constructed and colored, then the network element 151 combines packets in accordance with the operations in FIG. 8. For example, in operation 800, a parity check matrix V' of a (6,5) MDS code is constructed:

$$V' = \begin{pmatrix} 1 & 0 & 0 & 0 & 0 & 1 \\ 0 & 1 & 0 & 0 & 0 & 1 \\ 0 & 0 & 1 & 0 & 0 & 1 \\ 0 & 0 & 0 & 1 & 0 & 1 \\ 0 & 0 & 0 & 0 & 1 & 1 \end{pmatrix}.$$

Then, in operation 810, we allocate the same vector to the vertices (packets) with the same color to obtain:

$$A_1, A_3: \begin{pmatrix} 1 \\ 0 \\ 0 \\ 0 \\ 0 \end{pmatrix} A_2: \begin{pmatrix} 0 \\ 1 \\ 0 \\ 0 \\ 0 \end{pmatrix} B_1, B_2: \begin{pmatrix} 0 \\ 0 \\ 1 \\ 0 \\ 0 \end{pmatrix} C_2, C_3: \begin{pmatrix} 0 \\ 0 \\ 0 \\ 1 \\ 0 \end{pmatrix} B_3: \begin{pmatrix} 0 \\ 0 \\ 0 \\ 0 \\ 1 \end{pmatrix} C_1: \begin{pmatrix} 1 \\ 1 \\ 1 \\ 1 \\ 1 \end{pmatrix}.$$

Then, in operation 820, the combined codeword is given by $A_1 \oplus A_3 \oplus C_1$, $A_2 \oplus C_1$, $B_1 \oplus B_2 \oplus C_1$, $C_2 \oplus C_3 \oplus C_1$, $B_3 \oplus C_1$, of length 5/3 file units. The user destination devices may decode the received codeword using the packets already stored in their caches. For example, since user destination device 1 has packets $A_1$, $B_1$, and $C_1$ stored in its cache, the packets $A_2$, $A_3$ and $B_2$, $B_3$ are decoded by the user destination device 1 using packets $C_1$ and $B_1$ as keys.

It should be understood that the operations described above allow for improved performance of the network because example embodiments allow for the ability to cache more packets of the more popular files at destination devices 200, increase (or alternatively, maximize) the amount of distinct packets of each file collectively cached by the destination devices 200, and allow coded multicast transmissions within a full set of requested packets of the data files. By combining packets prior to transmission it should be understood that delivery methods and/or devices according to at least one example embodiment may reduce the number of transmissions of the network element 151 which may reduce consumption and improve network efficiency.

Referring to FIG. 3A, in operation 300, the network element 151 may determine popularities for a plurality of data files. The data files may be, for example, video and/or audio files. The network element 151 may determine the popularities based on requests for the plurality of data files from at least one of destination devices 200 (e.g., user requests). The user requests may form a demand distribution for the data files. The network element 151 may determine the popularities according to a demand distribution of all the destination devices 200. In this case, the demand distribution may follow a Zipf distribution. Alternatively, the network element 151 may determine the popularities on a per destination device basis where each destination device 200 has as associated demand distribution.

The network element 151 may determine the popularities based on a number of requests for the data files from the destination devices 200. For example, the network element 151 determines a data file that is requested 100 times by the destination devices 200 as having a higher popularity than a data file that is requested 50 times. Thus, the popularities may be based on which data files are most often requested and viewed by users of the destination devices 200.

The network element 151 may divide each data file into a plurality of packets. For example, the network element 151 may divide each data file in to a same number of packets (e.g., three packets). Accordingly, in operation 310, the network element 151 may send random packets of the plurality of data files to at least one destination device based on the popularities determined in operation 300. For example, the network element 151 may send random packets of each data file to destination devices 200 such that the random packets are stored (or cached) at each destination device 200.

Figure 11:
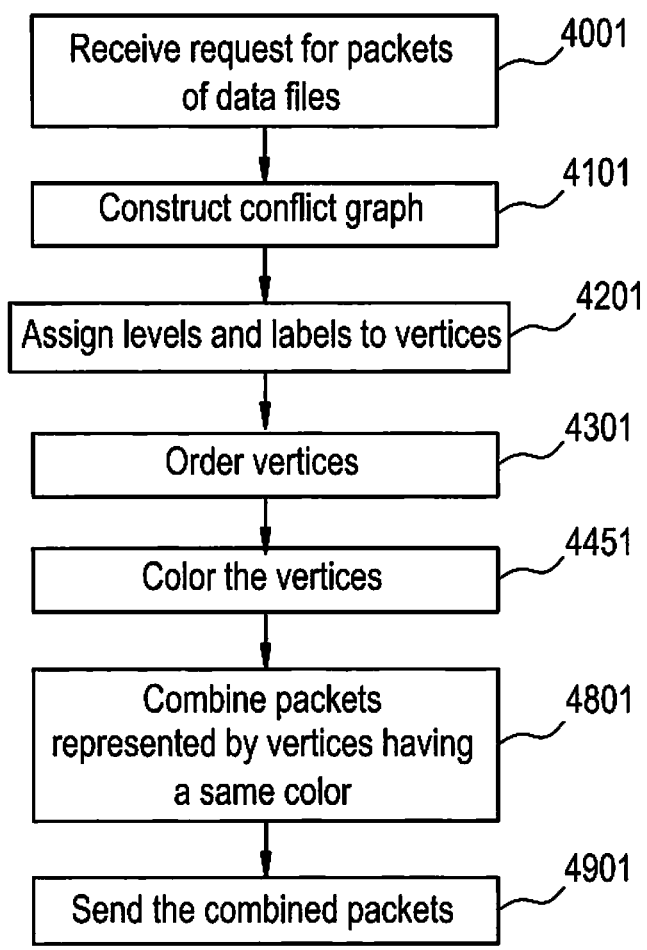
FIG. 11 illustrates example operations for a delivery phase according to at least one example embodiment.

FIG. 11 illustrates example operations for a delivery phase according to at least one example embodiment. With reference to FIG. 4, in operation 4001, the network element 151 receives requests from destination devices 200 (or user devices) for packets of the data files. Since the network element 151 has already performed the caching method described above, each destination device 200 requests only those packets that were not cached (or stored) as a result of the caching method Thus, the delivery phase consists of providing to each destination device 200 the missing part(s) of the requested files, i.e., the packets missing from that destination device's 200 memory.

In operation 4101, the network element 151 constructs the conflict graph. For example, the network element 151 populates a conflict graph with a plurality of vertices such that each packet requested by each destination device 200 is represented by a distinct vertex in a plurality of vertices of the conflict graph. Thus, even if a same packet is requested by K different users, the packet is represented as K different vertices in the conflict graph. In other words, each vertex in the conflict graph is associated with a unique pair of a destination device 200 and a requested packet. Thus, it may be said that each vertex of the conflict graph is associated with a destination device 200 and represents a packet requested by the destination device 200. Further, the network element 151 may construct the conflict graph based on which of the plurality of vertices represent a same requested packet and which requested packets are stored in caches belonging to the destination devices 200. Operation 4101 may correspond to the operations described with respect to FIG. 5.

Still referring to FIG. 11, in operation 4201, the network element 151 may assign the plurality of vertices to original levels. Each original level may indicate a number of requests for packets and a number of user destination 200 caches storing the packets. For example, each level may be a sum of the number of user destinations requesting a packet and the number of user device caches storing the requested packet. Thus, if a packet is requested by 4 destinations devices 200 and 3 of the destinations devices 200 are storing the packet, then the original level for the vertex associated with that packet is 3+4=7.

Still referring to FIG. 11, in operation 4201, the network element 151 may also assign labels to the plurality of vertices. Each label may indicate the destination devices 200 requesting the packet corresponding to the vertex and the destination device 200 caches storing the packet. For example, each label may be a set of indices corresponding to destination devices 200 requesting the packet and to destination devices 200 storing the requested packet. For example, if a packet is requested by 4 destination devices 200 (e.g., user 1, user 3, user 5, user 10) and 3 of the destinations devices 200 are storing the requested packet (e.g., user 2, user 4, user 8), then the set of indices for the vertex associated with the requested packet is $K_{v_i} = \{1, 3, 5, 10; 2, 4, 8\}$. Here, a length of the label is 7 (i.e., a sum of the number of destination devices requesting a packet and a number of destination device caches storing the packet).

In operation 4301, the network element 151 may order the vertices based on the assigned levels. For example, the network element 151 may order the vertices from a highest level to a lowest level in preparation for a coloring operation.

In operation 4451, the network element 151 colors the plurality of vertices as a way of labeling the requested packets on the conflict graph. For example, the network element 151 colors the plurality of vertices based on the order determined in operation 4301. Operation 4451 is discussed in further detail below with respect to FIG. 6.

In operation 4801, the network element 151 combines the requested packets represented by vertices having a same color. For example, the network element 151 performs exclusive-OR (XOR) operations (or other linear combination operations over a finite field) on the packets represented by the vertices having the same color.

In operation 4901, the network element 151 sends the combined packets. For example, the network element 151 sends the combined packets to the destination devices 200 via a multicast transmission. By combining packets prior to transmission it should be understood that delivery methods according to at least one example embodiment may reduce the number of transmissions of the network element 151 which may reduce consumption and improve network efficiency. It should be understood that the destination devices 200 may receive and decode the transmitted combined packets using a set of XOR operations (or a set of other linear combination operations). For example, the destination devices 200 may decode the combined packets using its cached packets as a key.

Figure 12A:
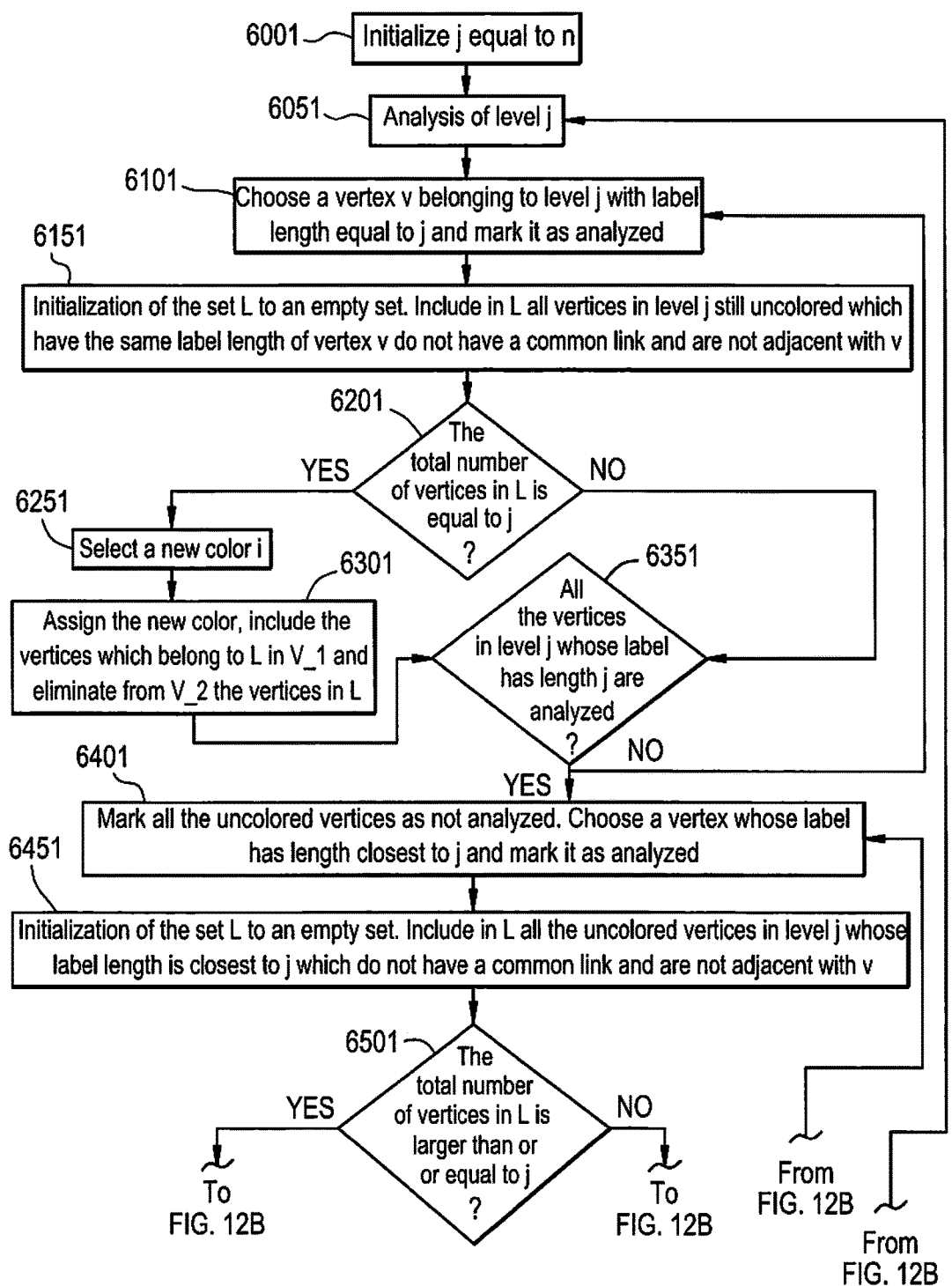
FIGS. 12A and 12B illustrate example operations for coloring a conflict graph according to at least one example embodiment.
Figure 12B:
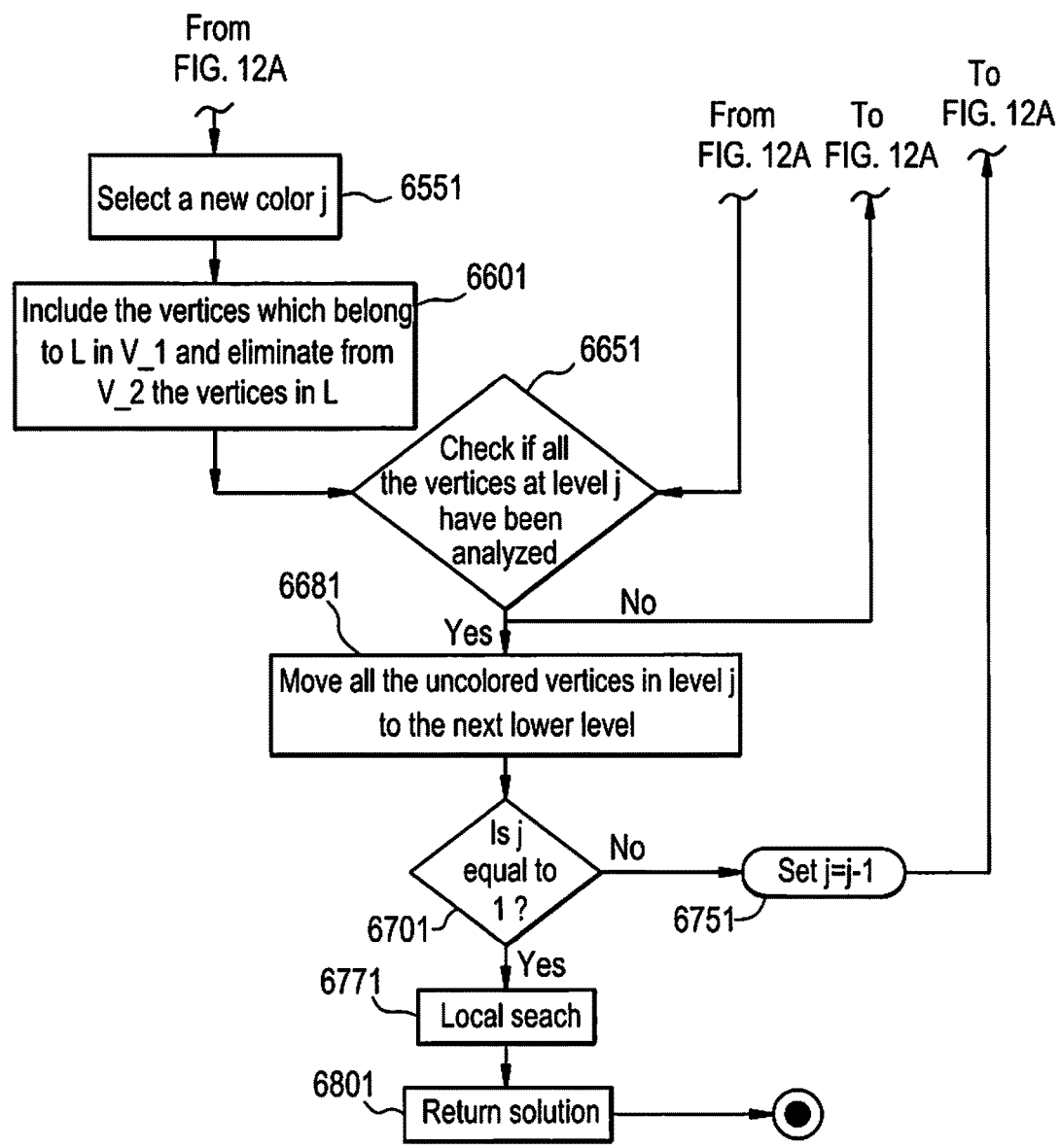

FIGS. 12A and 12B illustrate example operations for coloring a conflict graph according to at least one example. The undirected conflict graph discussed with reference to FIG. 5 may be used in conjunction with the example operations in FIGS. 12A and 12B, which relate to a coloring scheme referred to in this application hierarchical greedy coloring (HgC) scheme. This coloring scheme is described in more detail below with reference to FIGS. 12A and 12B.

The operations of FIGS. 12A and 12B relate to the algorithms discussed below.

---

Algorithm 1 HgLC$_1$

---

1: $C = \emptyset$;
2: $c = \emptyset$;
3: choose $a \in [0,1]$
4: choose $b \in [0,1]$
5: for all $i = n, n-1, \ldots, 2, 1$ do
6:   for all $v \in G_i$ and $|K_v| = i$ do
7:     $I = \{v\}$;
8:     for all $v' \in G_i \setminus I$ with $|K_{v'}| = |K_v|$ do
9:       if {There is no edge between v' and I} then
10:         $I = I \cup v'$;
11:       end if
12:     end for
13:     if $|I| = i$ then
14:       Color all the vertices in I by $c \notin C$;
15:       $c[I] = c, C = C \cup c$;
16:       $G_i = G_i \setminus I$;
17:     end if
18:   end for
19:   for all Randomly pick a, $v \in W_1 \subset G_i$, with
    $W_1 = \{v \in G_i : \min_{v \in G_i} |K_v| \le |K_v| \le \min_{v \in G_i} |k_v| + \lfloor a \, (\max_{v \in G_i} |K_v| - \min_{v \in G_i} |K_v|) \rfloor\}$ do
20:     $I = \{v\}$;
21:     $Q_i = G_i \setminus I$;
22:     for all Randomly pick a $v' \in W_2 \subset Q_i$, with
    $W_2 = \{v' \in Q_i : \min_{v \in Q_i} |K_{v'}| \le |K_{v'}| \le \min_{v \in Q_i} |K_{v'}| + \lfloor b \cdot (\max_{v \in Q_i} |K_{v'}| - \min_{v \in Q_i} |K_{v'}|) \rfloor\}$ do
23:       if {There is no edge between v' and I} then
24:         $I = I \cup v'$;
25:         $Q_i = Q_i \setminus \{v'\}$;
26:       else
27:         $Q_i = Q_i \setminus \{v'\}$;
28:       end if
29:     end for
30:     if $|I| \ge i$ then
31:       Color all the vertices in I by $c \notin C$;
32:       $c[I] = c, C = C \cup c$;
33:       $G_i = G_i \setminus I$;
34:     else
35:       $G_i = G_i \setminus \{v\}, G_{i-1'} = G_{i-1} \cup \{v\}$;
36:     end if
37:   end for
38: end for
39: $c = \text{LocalSearch}(Hc, w, c, C)$;

In the above algorithm (referred to as "HgC Algorithm"), let f(v) be the packet represented by vertex v in the conflict graph, Define U as the set of user destination devices, $K_v=\{\forall u \in U: f(v) \in Q_u \cup C_u\}$, where Q is the set of all the packets requested by user destination device u and $C_u$ is the set of all the cached packets by user destination device u. We refer to $K_v$ as the label associated to vertex "v". For example, if vertex $v_1$ representing packet $A_1$ ($f(v_1)=A_1$) is requested by user destination device 1 and user destination device 2, and cached in user destination device 3 and user destination device 4, then $K_{v_1}=\{1, 2; 3, 4\}$.

Let $G_i=\{v:|K_v|=i\}$. We consider $G_i$ as the original hierarchies (or levels). We start from hierarchy (or level) n, which is the highest hierarchy or level. First, we color a subset of vertices in $G_n$ with the same color if: they have the same $|K_v|=n$, and the cardinality of such set is equal to n and there are no links between any two vertices of such set in the conflict graph (i.e., searching for the independent set with a size "n" in a greedy manner). (Note that two nodes having the same $|K_v|$ and not being connected by a link in the conflict graph is equivalent to stating that they have the same $K_v$). Then we merge the rest of the uncolored vertices in $G_n$ with $G_{n-1}$ (i.e., $G_{n-1} \equiv G_{n-1} \cup G_n$, line 35 of the HgC Algorithm) to result in a new hierarchy (or level) n−1.

In the hierarchy (or level) n−1, for all $K_v$ such that $|K_v|=n-1$, we first color a subset of vertices in $G_{n-1}$ the same colors if: they have the same $|K_v|=n-1$, the cardinality of such set is equal to n and there are no links between any two vertices of such set. Then we try to color the rest of the vertices in $G_{n-1}$.

The criteria we use to color the rest of the vertices in $G_{n-1}$ are we first randomly select a vertex v from $W_1 \subseteq G_{n-1}$ shown in line 19 of the HgC Algorithm, where $W_1$ denotes a set of vertices with "small" $|K_v|$, $v \in G_{n-1}$ or "large degree" in $H_{C,Q}$, and where the value $a \in [0,1]$ controls the size of $W_1$. For example, if a=0, then $W_1$ denotes the vertex with the smallest $|K_v|$, $v \in G_{n-1}$.

Second, we try to color with the same color the selected vertex v and the vertices $v' \in W_2 \subseteq G_i \setminus \{v\}$ where $W_2$ is defined as the set of uncolored vertices in the "i" level whose $|K_{v'}|$, with $v' \in G_i \setminus \{v\}$ are "close" to $|K_v|$ in a greedy manner. Similar to the parameter $a \in [0,1]$, this closeness is captured by another parameter $b \in [0,1]$ as shown in line 22 in the algorithm. For example, if b=0, then we start from the vertex v' such that $|K_{v'}|-|K_v|$ is minimized. Here, we are looking for the independent set with a size of at least "i" in the i-th hierarchy (or level) in a greedy manner.

After this second coloring procedure, we union the uncolored vertices with the vertices of next hierarchy (or level), which, in this case, is $G_{n-2}$. Then, we repeat the same procedure for all the hierarchies (or levels).

Finally, we use a function called LocalSearch to further reduce the number of colors used for the final conflict graph in line 39 of the HgC Algorithm. The details of the LocalSearch are given by the algorithm below.

Algorithm 2 LocalSearch($H_{c,w}$,c,C)

1: for all c ∈ C do
2:    Let $J_c$ be the set of vertices whose color is c;
3:    Let B = ∅;
4:    Let ĉ = c;
5:    for all i ∈ J do
6:       A = ∅;
7:       for all j ∈ N(j) do
8:          A = A ∪ c[j];
9:       if C \ A ≠ ∅ then Algorithm 2 LocalSearch($H_{c,w}$,c,C)

10:          c' is randomly picked from C \ A;
11:          ĉ[i] = c';
12:          B = B ∪ {i};
13:       end if
14:    end for
15:    if |B| = |$J_c$| then
16:       c = ĉ;
17:       C = C \ c;
18:    end if
19:    end for
20: end for
21: return c;

Here, let N(j) denote the neighboring vertices of vertex "j" (excluding vertex "j"). For clarity, we use a comma to separate the user destination device requesting $A_1$ and the user destination devices caching $A_1$. Furthermore, c is the desired vector showing the coloring. The complexity of the HgC algorithm is $O(n^3 B^2)$.

It should be understood that the operations illustrated in FIGS. 12A and 12B relate to the HgC Algorithm for a=0 and b=0 and correspond to operations performed as part of operation 4451 in FIG. 11. Initially, the network element 151 defines 'V' as the vertices in the conflict graph, V_1 as a set of colored vertices, and V_2 as a set of uncolored vertices. Before the coloring operations begin, set V_1 is empty and V_2=V.

In operation 6001, the network element 151 initializes level j=n, where n denotes a highest level from among the assigned levels (recall that the vertices were ordered based on their assigned levels in operation 430). In operation 6051, the network element 151 selects level 'j' for analysis.

In operation 6101, the network element 151 selects a vertex 'v' belonging to level j with a label length equal to j and marks that vertex as being analyzed. In operation 6151, the network element 151 forms a set 'L' of the vertices. The network element 151 forms the set L with the vertices in level j that i) have the same label length as vertex v (i.e., have the same $|K_v|$), ii) are uncolored, iii) are not linked to each other, and iv) are not linked to vertex v. In operation 6201, the network element 151 determines if the number of vertices in set L (which includes vertex v) is equal to the number of level j. If not, then the network element 151 does not assign a color to the vertices in set L and proceeds to operation 6351 to check if all vertices in level j have been analyzed. If the number of vertices in set L is equal to j, then the network element 151 selects a new color in operation 6251 (e.g., a color not yet used in the conflict graph). In operation 6301, the network element 151 assigns the new color to vertices in set L, includes the vertices in set L in set V_1, and eliminates the vertices in set L from set V_2.

Then, in operation 6351, the network element 151 determines whether all of the vertices in level j that have a label length of j have been analyzed. If not, then the network element 151 returns to operation 6051. If so, then the network element 151 proceeds to operation 6401.

In operation 6401, the network element 151 determines which vertices in level j have not been colored, marks these uncolored vertices as not analyzed, selects a vertex 'w' whose label has length greater than or equal to level j, and marks vertex 'w' as analyzed. This is equivalent to the description above regarding coloring the rest of the vertices in $G_{n-1}$ when a=0.

In operation 6451, the network element 151 resets set L to an empty set and forms set L to include the still uncolored vertices in level j having a label with a length closest (or larger than or equal to) to j that are not linked to each other and are not linked to vertex "w". In operation, 650, the network element 151 determines whether the number of vertices in set L (which includes vertex "w") is greater than or equal to "j". If not, then the network element 151 does not color any vertices and proceeds to operation 665 to determine if all vertices at level j have been analyzed.

If, in operation 6501, the network element 151 determines that the total number of vertices in set L is greater than or equal to j, then the network element 151 selects a new color in operation 6551 (e.g., a color not yet used in the conflict graph). In operation 6601, the network element 151 assigns the new color to vertices in set L, includes the vertices in set L in set V_1, and eliminates the vertices in set L from set V_2. In operation 6651, the network element 151 determines whether all the vertices at level j have been analyzed. If not, then the network element 151 returns to operation 6401. If so, then, in operation 6681, the network element 151 moves all the uncolored vertices in level j to the next lower level to create a new level j-1 which is given by the union of all vertices originally belonging to level j-1 with the uncolored vertices belonging to level j. Next, in operation 6701, the network element 151 determines if level j is equal to one (or the lowest assigned level from among the assigned levels).

If level j is equal to one (or the lowest assigned level from among the assigned levels), then the network element 151 proceeds to operation 6771. Otherwise, in operation 6751, the network element 151 sets level j to j-1 and returns to operation 605. In operation 6751, it should be understood that the network element 151 places any uncolored vertices remaining in level j into a next lowest level (i.e., j-1) in order to ensure that all vertices of the conflict graph are assigned a color. In operation 6771, the network element performs a local search in an attempt to reduce the total number of colors used in the conflict graph. For example, the network element 151 selects a color from existing colors of the conflict graph, identifies vertices with the selected color, and replaces the selected color with a different color chosen from the existing colors if vertices linked to the identified vertices are not colored with the different color. Thus, the selected color is eliminated from the set of existing colors. Then, the network element 151 returns a colored conflict graph as the solution in 680.

In view of the operations shown in FIGS. 12A and 12B, it should also be understood that operations of FIGS. 12A and 12B may correspond to the network element 151 selecting an uncolored vertex having the highest level, and assigning a same color to the selected vertex and to a subset of uncolored vertices in the plurality of vertices if (i) the vertices in the subset have an assigned label with a desired length, the desired length being based on input parameters and on the length of the label of the selected vertex, (ii) the vertices in the subset do not have a link to the selected vertex, (iii) the vertices in the subset do not have link between each other, and (iv) a cardinality of the subset is equal to the value of the level minus one. It should be further understood that operations of FIGS. 12A and 12B correspond to the network element 151 performing the selecting and the assigning a same color operations iteratively until all vertices of the highest level have been selected, and updating vertices of the highest level that are still uncolored to a next level below the highest level. Still further, it should be understood that operations of FIGS. 12A and 12B are performed by network element 151 until all of the vertices of the conflict graph are colored. Still further, it should be understood that the levels may also be referred to as hierarchies and the set of vertices assigned to level (or hierarchy) "j" is denoted with $G_j$ so the operation of placing all the uncolored vertices remaining in level j into level j-1 is equivalent to forming the set $G_{j-1}$. It should be understood that this operation of forming $G_{j-1}$ is equivalent to operation 6681.

Figure 13:
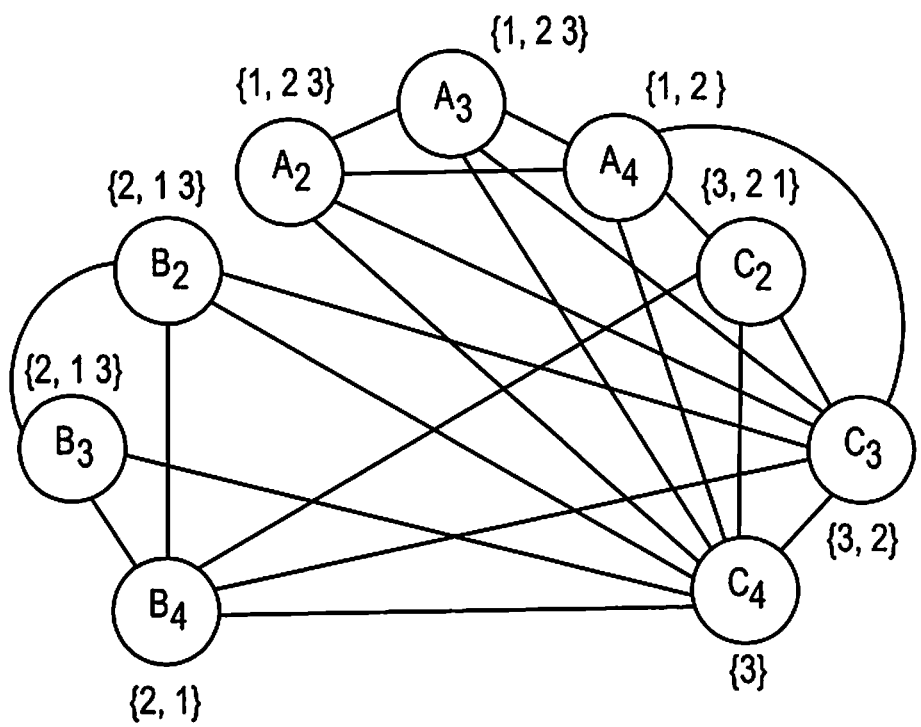
FIG. 13 illustrates a colored conflict graph according to at least one example embodiment.

FIG. 13 illustrates a colored conflict graph according to at least one example embodiment. For example, FIG. 13 illustrates a conflict graph constructed according to FIG. 5 and colored according to the HgC scheme and the operations of FIGS. 12A and 12B.

In FIG. 13, we consider a shared link network with n=3 destination devices (or user devices) 200 (i.e., U={1, 2, 3}), and m=3 data files A, B, C (i.e., F={A, B, C}. Each data file is divided into four packets. For example, data file A has four packets of $\{A_1, A_2, A_3, A_4\}$. For the caching phase (i.e., see FIGS. 3A and 3B and related description), let user device 1 cache $\{A_1, B_1, B_2, B_3, B_4, C_2\}$, user device 2 cache $\{A_1, A_2, A_3, A_4, B_1, C_2, C_3\}$, and user device 3 cache $\{A_1, A_2, A_3, B_1, B_2, B_3\}$. Then, let user devices {1, 2, 3} request data files {A, B, C} respectively. Equivalently, user device 1 requests A2, A3, A4; user device 2 requests B2, B3, B4; and user device 3 requests C1, C2, C3, C4. Then, we have $K_{A2}$={1, 2 3} (the comma is used to separate the user device requesting packet A2 from the user devices that have cached packet A2. Here, packet A2 is requested by user device 1, while packet A2 is cached by user devices 2 and 3); $K_{A3}$={1; 2, 3}; $K_{A4}$={1; 2}; $K_{B2}$={2; 1, 3}; $K_{B2}$={2; 1, 3}; $K_{B4}$={2; 1}; $K_{C2}$={3; 1, 2}; $K_{C3}$ {3; 2}; $K_{C4}$={3} (here C4 is requested by user device 3 and not cached anywhere The HgC scheme works as follows (with reference to the HgC algorithm and FIGS. 12A and 12B). For j=n=3, G3={A2, A3, B2, B3, C2}, let vertex v=A2, then it can be found that B2 and C2 would be in set L, hence set L={A2, B2, C2}. Now since |L|=n=3, we color A2, B2, C2 with black. Then 3=G3\L={A3, B3}. In the following loop, since we cannot find a set I with |L|=n=3, we move to line 21 of the algorithm. Then since we cannot find set L with |L|≥n=3, then we do G2=G2∪{A3}, and then G2=G2∪{B3}. Therefore, we obtain G2={A3, A4, B3, B4, C3}. Now we go to line 3 of the algorithm (i.e., start next loop). For j=j-1=n-1=2, in this loop, we first pick vertex v=A4, then we find L={A4, B4}. We color {A4, B4} with blue (see FIG. 4). Now G2=G2\{A4, B4}={A3, B3, C3}. Then in line 21 of the algorithm, we find the vertex with smallest length of Kv, which is C3 with $K_{C3}$={3; 2}, then we find L={C3, B3}. We color L={C3, B3} with red. Now G2=G2\{C3, B3}={A3}. Since there is no L≥2, then we do G1=G1∪{A3}={C4, A3}. Then we go to next loop j=j-1=n-2=1. Then, we can see that L={C4}, and we color {C4} with purple. Then G1=G1\{C4}={A3}. Hence, we can find L={A3} and we color {A3} with brown. The fully colored conflict graph is shown in FIG. 13.

It should be understood that the operations described above allow for improved performance of the network because example embodiments allow for the ability to cache more packets of the more popular files at destination devices 200, to increase (or alternatively, maximize) the amount of distinct packets of each file collectively cached by the destination devices and to allow coded multicast transmissions within a full set of requested packets of the data files. By combining packets prior to transmission it should be understood that delivery methods and/or devices according to at least one example embodiment may reduce the number of transmissions of the network element 151 which may reduce consumption and improve network efficiency. For example, in some scenarios of interest, the above described methods and devices may reduce the number of transmissions up to a factor of 10. If we have unlimited complexity, the gain can be unbounded. Further, it should be appreciated that a memory (or cache) size of each user destination may be used as a bandwidth multiplier.

Figure 14:
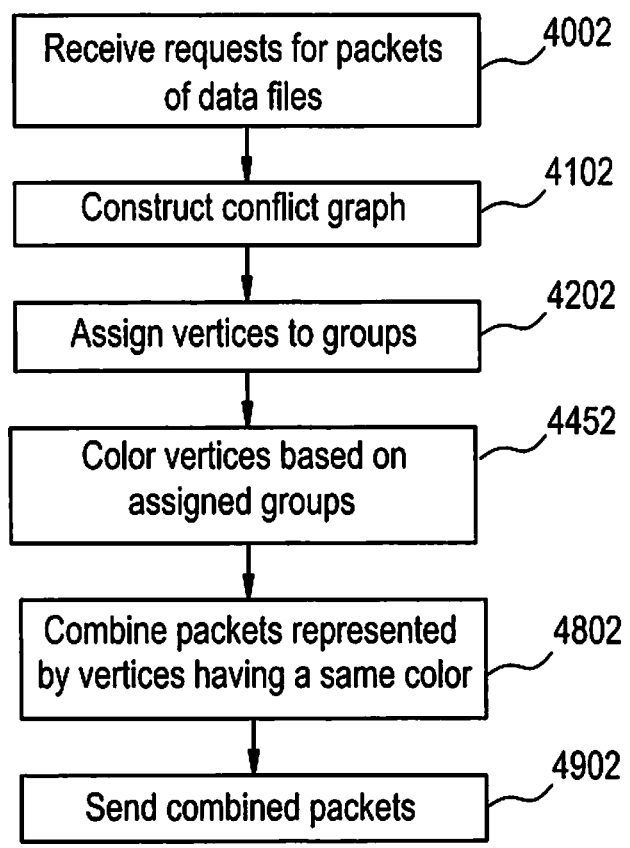
FIG. 14 illustrates example operations for a delivery phase according to at least one example embodiment.

FIG. 14 illustrates example operations for a delivery phase according to at least one example embodiment. With reference to FIG. 14, in operation 4002, the network element 151 receives requests from destination devices 200 (or user devices) for packets of the data files. Since the network element 151 has already performed the caching method described above, each destination device 200 requests only those packets that were not cached (or stored) as a result of the caching method. Thus, the delivery phase consists of providing to each destination device 200 the missing part(s) of the requested files, i.e., the packets missing from that destination device's 200 memory.

In operation 4102, the network element 151 constructs the conflict graph with a plurality of vertices such that each packet requested by each destination device 200 is represented by a distinct vertex in a plurality of vertices of the conflict graph. Thus, even if a same packet is requested by K different users, the packet is represented as K different vertices in the conflict graph. In other words, each vertex in the conflict graph is associated with a unique pair of a destination device 200 and a requested packet. Thus, it may be said that each vertex of the conflict graph is associated with a destination device 200 and represents a packet requested by that destination device 200. Further, the network element 151 may construct the conflict graph based on which of the plurality of vertices represent a same requested packet and which requested packets are stored in caches belonging to the destination devices 200, Operation 4102 may correspond to the operations from FIG. 5 above.

Still referring to FIG. 14, in operation 4202, the network element 151 may assign the plurality of vertices to groups. Each group may indicate a number of links to the plurality of vertices. For example, each vertex may have a given number of links to surrounding vertices. In one example, if vertex A and vertex B each have three links to other vertices and vertex C and vertex D each have four links to other vertices, then vertices A and B belong to one group (e.g., group 3) and vertices C and D belong to a different group (e.g., group 4).

In operation 4452, the network element 151 colors the plurality of vertices as a way of labeling the requested packets on the conflict graph. For example, the network element 151 colors the plurality of vertices based on the groups assigned in operation 4302. Operation 4452 is discussed in further detail below with respect to FIG. 15.

In operation 4802, the network element 151 combines the requested packets represented by vertices having a same color. For example, the network element 151 performs exclusive-OR. (XOR) operations (or other linear combination operations over a finite field) on the packets represented by the vertices having the same color.

In operation 4902, the network element 151 sends the combined packets. For example, the network element 151 sends the combined packets to the destination devices 200 via a multicast transmission. By combining packets prior to transmission it should be understood that delivery methods according to at least one example embodiment may reduce the number of transmissions of the network element 151 which may reduce consumption and improve network efficiency. It should be understood that the destination devices 200 may receive and decode the transmitted combined packets using the XOR operations (or other linear combinations over a finite field). For example, the destination devices 200 may decode the combined packets using packets stored in the cache as keys.

Figure 15:
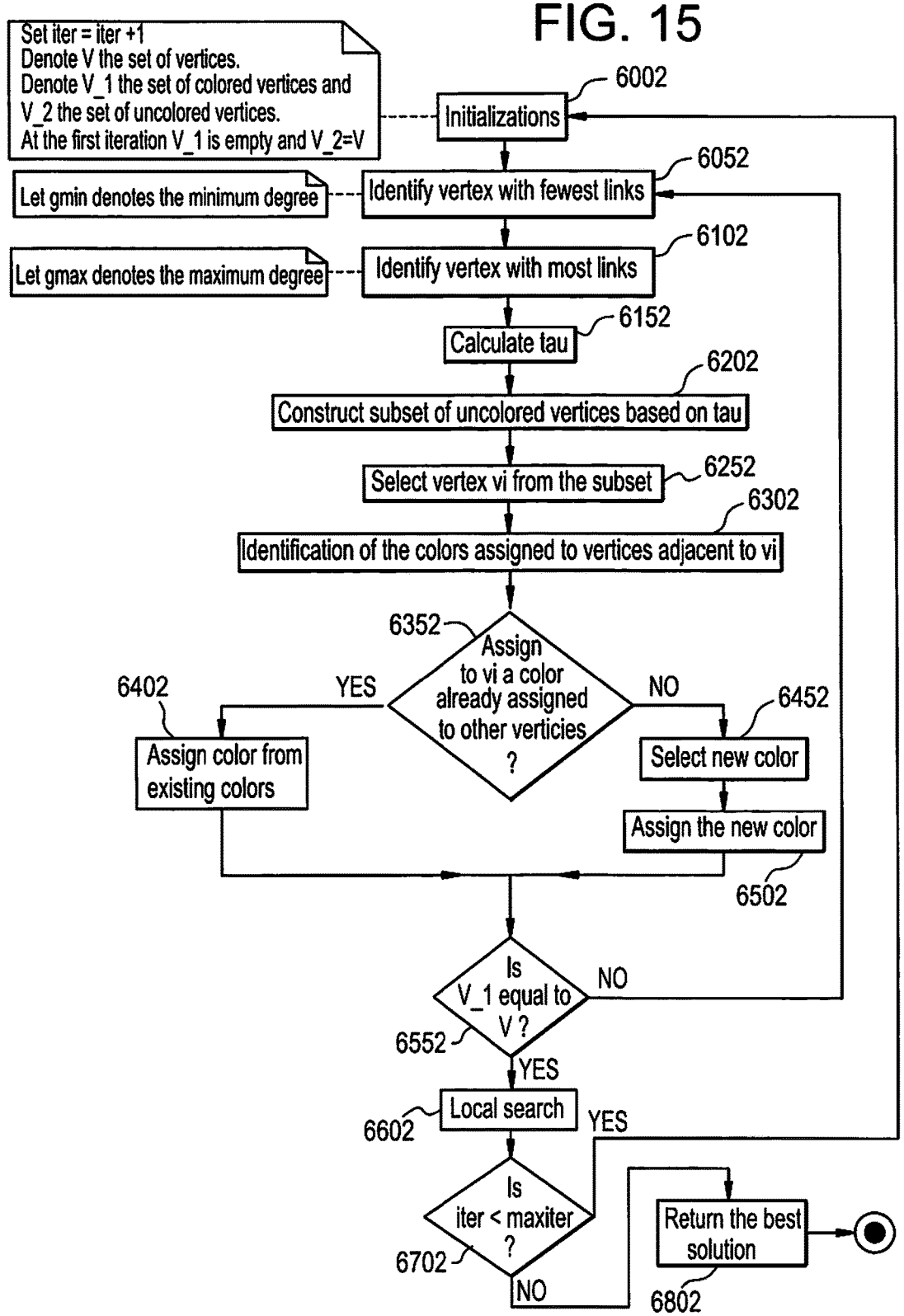
FIG. 15 illustrates example operations for coloring a conflict graph according to at least one example embodiment.

FIG. 15 illustrates example operations for coloring a conflict graph according to at least one example embodiment. In this application, the coloring scheme may be referred to as a greedy randomized algorithm search procedure (GRASP) coloring scheme. The GRASP coloring scheme may be employed in conjunction with the undirected conflict graph constructed according to the operations of FIG. 5 described above. This coloring scheme is described in more detail below with reference to FIG. 15.

The operations in FIG. 15 may correspond to the algorithms below. The general GRASP coloring scheme algorithm is below:

```
algorithm GRASP_GraphColoring {MaxIterations,
V, E, d, Adj(-), f(-)}
1  c_best := ∅; f(c_best) := +∞;
2  V := sort(V);
3  for k = 1 to MaxIterations →
4      C := ∅;
5      β := random[0,1];
6      c := BuildGreedyRandAdaptive{β, V, E, d, Adj(-), f(-), C}
7      c* := LocalSearch{V, E, c, f(c), C};
8      if {f(c*) < f(c_best)} then
9          c_best := c*;
10         f(c_best) := f(c*);
11     endif
12 endfor
13 return{c_best};
end    GRASP_GraphColoring
```

The function "BuildGreedyRandAdaptive" is defined as:

```
function BuildGreedyRandAdaptive{β, V, E, d, Adj(-), f(-), C}
1  c := ∅;
2  for j = 1 to |V| →
3      RCL := MakeRCL{β, V, E, d, c};
4      i := SelectIndex {RCL};
5      c := GetColor (V, E, i, C, Adj(-), c);
6      c[i] := c;
7      if {c ∉ C} then
8          C := C∪{c};
9          f(c) := |C|;
10     endif
11 endfor
12 return{c};
end    BuildGreedyRandAdaptive
```

The function "MakeRCL" is defined as:

```
function MakeRCL (β, υ, ε, d, c)
1   g_min := min d(i);
            i∈∧c
2   g_max := min d(i);
            i∈∧c
3   τ := g_min + [β · (g_max − g_min)] ;
4   RCL := {i ∈ υ \ c | d(i) ≥ τ} ;
5   return(RCL);
end MakeRCL
```

The function "GetColor" is defined as:

```
function GetColor {V , E , i, C , Adj(-), C}
1  L := ∅;
2  for each j ∈ Adj(i) L := L∪{c[i]};
3  if{C\ L ≠ ∅} then
4      c' := SelectColor {C\L};
```

-continued

```
 5    else
 6      c' := NewColor {C};
 7    endif
 8    return(c');
   end   GetColor
```

The function "LocalSearch" is defined as:

```
function LocalSearch{V, E, c, f(c), C}
 1  for each c ∈ C →
 2    G_c := {i ∈ V | H[i] = c};
 3    B := ∅;
 4    c := c;
 5    for each i ∈ G_c →
 6      A := ∅;
 7      for each j ∈ Adj(i) A := A∪{c[j]};
 8      if {C\A ≠ ∅} then
 9        c' := SelectColor {C\ A};
10        c[i] := c';
11        B := B∪{i};
12      endif
13    endfor
14    if {|B| = |G_c|} then
15      c := c;
16      C := C\{c};
17      f(c) := |C|;
18    endif
19  endfor
20  return{c};
  end  LocalSearch
```

In the pseudo code above, $H_{M,W}=(V, E)$ represents the (undirected) conflict graph, where V and E denote the set of vertices and edges (or links), respectively, of the undirected conflict graph $H_{M,W}$ constructed as discussed above with reference to FIG. 5. In $H_{M,W}$, for each vertex $i \in V$, $Adj(i) = \{j \in V | [i, j] \in E\}$. $c_{best}$ is denoting the best association color-vertex found by the algorithm. Let $d(i)=|Adj(i)|$, for all $i \in V$, be the degree of (or number of links to) vertex i. Let $c_{best}=\emptyset$ be the solution under construction, i.e., the set of vertices already assigned to a color (initially an empty set), and let $C=\emptyset$ (initially an empty set) be the set of colors that are associated to at least a vertex in $c_{best}$. At each iteration, the following operations are performed:

1. Let $d(i)=|Adj(i)|$, for all $i \in V$, be the degree of (or number of links to) vertex i. Let $c_{best}=\emptyset$ be the solution under construction (initially empty), i.e., the set of vertices already assigned to a color, and let $C=\emptyset$ (initially empty) be the set of colors that are associated to at least a vertex in $c_{best}$.
2. Select at random uniformly in [0,1] the parameter $\beta$.
3. Compute (see Function MakeRCL):

$g_{min}$, the minimum greedy value: $g_{min} = \min_{i \in V \setminus c} d(i)$;

$g_{max}$, the maximum greedy value: $g_{max} = \max_{i \in V \setminus c} d(i)$;

a threshold value tau ($\tau$):

$\tau = g_{min} + [\beta \cdot (g_{max} - g_{min})]$, where $\beta \in [0,1]$; and RCL as the subset of candidate uncolored vertices whose degree is at least $\tau$:

$RCL = \{i \in V \setminus c | d(i) \geq \tau\}$;

4. Perform the following operations until all the vertices are colored:

a. A vertex i is randomly selected from the RCL ((see line 4 of the function BuldGreedyRandAdaptive, i.e. i=SelectIndex(RCL)).

Note that the value of $\beta \in [0,1]$ determines the percentage of greediness versus randomness in the choice of the vertices to be inserted in the RCL at each iteration. For example, for $\beta=1$, the choice is totally greedy and only vertices with degree $g_{max}$ are inserted in to RCL. As another example, for $\beta=0$, the choice is totally random and all candidate vertices are inserted in to RCL (i.e., RCL=W);

b. Selected vertex i and analyze its adjacent vertices (see function GetColor); four possible scenarios may occur:

I. all adjacent vertices are still uncolored and the set $C=\emptyset$: in this case, a new color c is assigned to vertex i and $C=C \cup \{c\}$ (FIG. 7A);

II. all adjacent vertices are still uncolored and the set $C=\emptyset$: in this case, vertex is colored with the first color $c \in C$ available (FIG. 7B);

III. at least one adjacent vertex is colored with a color c e C and all currently used colors $c \in C$ are already assigned to at least an adjacent vertex: in this case, vertex i is colored with a new color c' and $C=C \cup \{c'\}$ (FIG. 7C); and IV. at least one adjacent vertex is colored with a color c C and there is a color $c' \in C$ that has not been assigned to any adjacent vertex: in this case, vertex i is colored with color c' (FIG. 7D).

c. Vertex i is inserted into the solution under construction (c[i]=c' or c[i]=c, according to scenarios (I) to (IV) and the objective function value coherently updated (i.e., f(c)=|C|).

5. Once all the vertices of the conflict graph are colored, then the function BuidGreedyRandAdaptive returns the solution $c_{best}$.

6. A local search is implemented which takes as input $c_{best}$ and returns a new valid color c* (see Function LocalSearch). Iteratively, for each color $c \in C$ computes the set $G_c$ of all vertices colored with color c (line 2 of the Function LocalSearch) and performs the following steps:

a. For each vertex $i \in G_c$, search vertices Adj(i), i.e., the vertices adjacent to vertex i. If there is a color $c' \in C$, $c' \neq c$, not assigned to any adjacent vertex $j \in Adj(i)$, then vertex i becomes colored with color c';

b. Color c is removed from the set C if and only if it was possible to replace c associated with each vertex $i \in G_c$ with some color c', $c' \neq c$ 7. If the number of colors used in c is smaller than the number of colors used in $c_{best}$ then set $c_{best}$ equal to c*, otherwise keep $c_{best}$ as the partial solution. (see lines 8-12 of the GRASP algorithm).

8. Repeat all the above operation 1 to 7 until k#MaxIterations and return $c_{best}$ as the solution.

From the above description, it should be appreciated that the GRASP coloring scheme performs a desired number of iterations, until a stopping criterion is met (such as, for example, a maximum number of iterations or a desired running time). At each iteration, a greedy-randomized adaptive solution c is built starting from c as an initial solution, and a local search phase is performed returning a locally optimal solution c*. At the end of the iterations, the best locally optimal solution $c_{best}$ (i.e., the solution corresponding to the best function objective value $f(c_{best})$) is returned as final solution and the algorithm stops.

The GRASP coloring scheme is able to tackle problem instances characterized by any graph topology, density/sparsity, and any size. The local search strategy checks for redundant colors by focusing on each vertex, one at a time.

The above algorithms will now be described with reference to FIG. 15. In operation 6002, the network element 151 sets initial conditions. For example, the network element 151 sets a number of iterations "maxiter" that will be performed for the GRASP coloring scheme. The number of iterations "maxiter" may be user defined and/or based on empirical evidence. In the following operations, 'V' is the set of vertices of the conflict graph, 'V_1' is the set of colored vertices, and 'V_2' is the set of uncolored vertices. At the first iteration, V_1 is empty and V_2=V.

In operation 6052, the network element 151 determines which of the vertices in V have a fewest number of links (or edges) based on the assigned groups as 'gmin'. For example, if there are groups 2 to 6, where group 2 vertices have two links, group 3 vertices have three links, and so on, then two links is the fewest number of links to a vertex for the entire conflict graph, and gmin is set as '2.' In operation 6102, the network element 151 determines which of the vertices in V have a greatest number of links (or edges) based on the assigned groups as 'gmax'. In the example above, gmax may be set to '6' since the largest group number is group 6, meaning that the greatest number of links to any one of the vertices in the conflict graph is 6 links. In operation 6152, the network element 151 calculates a threshold, tau, based on 'gmin' and 'gmax'. For example, the network element 151 may calculate the threshold such that tau=gmin+β (gmax−gmin), where β is a constant that is user defined and/or based on empirical evidence (e.g., β may be chosen uniformly at random within [0,1].

In operation 6202, the network element 151 may construct a subset (or a restricted candidates list "RCL") of uncolored vertices belonging to groups having a number of links greater than or equal to the threshold tau. It should be understood that the value of β depends on the amount of "greediness" versus the amount of "randomness" in the choice of the vertices to be included in the subset. For example, for β=1, the choice is completely greedy since only those vertices with a greatest number of links will be included in the subset. If, for example, β=0 then all vertices will be included in the subset.

In operation 6252, the network element 151 selects (e.g., randomly selects) a vertex "Vi" from the subset created in operation 6202. In operation 6302, the network element 151 identifies the colors of vertices that are adjacent (or linked) to vertex Vi as a first set of colors. As part of operation 6302, the network element 151 may also identify the existing colors of the conflict graph as a second set of colors. In operation 6352, the network element 151 determines if an existing color of the conflict graph can be assigned to vertex Vi. For example, in operation 6402, the network element 151 colors vertex Vi with a desired color from the second set if the first set of colors and the second set of colors do not coincide. Otherwise, in operation 6452, if the first set of colors and the second set of colors coincide, then the network element 151 selects a new color, and in operation 6502 assigns the new color to vertex Vi and includes the new color in the set of colors existing for coloring the conflict graph, Operation 6352 is discussed in more detail below with reference to FIGS. 16A-16D.

In operation 6552, the network element 151 determines whether the all of the vertices are colored. If not, then the network element 151 returns to operation 6052. If so, then the network element 151 performs a local search (e.g., the LocalSearch algorithm above) it operation 6602 to reduce the number of colors used for the conflict graph (i.e., reduce the number of colors from set V_1). For example, the network element 151 may select a color from existing colors of the conflict graph, identify vertices with the selected color, and replace the selected color with a different color chosen from the existing colors if vertices linked to the identified vertices are not colored with the different color. Thus, the selected color is eliminated from the set of existing colors.

In operation 6652, the network element may select the best solution (i.e., the solution that results in a fewest number of colors used for the conflict graph) from solutions generated by the local search. In operation 6702, the network element 151 determines whether the current iteration "iter" is less than the number of iterations "maxiter" set in operation 6002. If so, then the network element 151 returns to operation 6002 and increments the number of iterations "iter" by one (i.e., sets iter=iter+1). As part of operation 6702, the network element 151 may store a result of the local search in a memory (where the result is a colored conflict graph). If the network element 151 determines that the current number of iterations "iter" is equal to "maxiter", then the network element 151 proceeds to operation 6802 and returns the best solution from among the stored solutions found by each iteration. For example, the network element 151 returns the conflict graph that uses the fewest number of colors.

FIGS. 16A-16D illustrates a colored conflict graph according to at least one example embodiment. For example, FIGS. 16A-16D show an example related to operations 6252-6502 in FIG. 15. In FIGS. 16A-16D, the vertex Vi selected in operation 6252 is represented by the vertex "i" and vertices "j", "k", "x", and "y" are identified in operation 6302 as being adjacent (or linked) to vertex "i" (i.e., Adj(i)={j, k, x, y}.

Figure 16A:
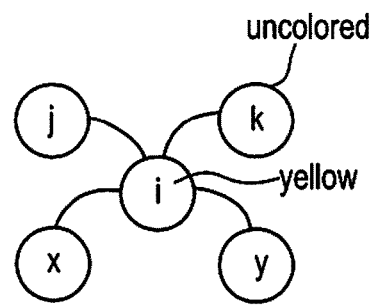
FIGS. 16A-16D illustrate coloring a conflict graph according to at least one example embodiment.
Figure 16B:
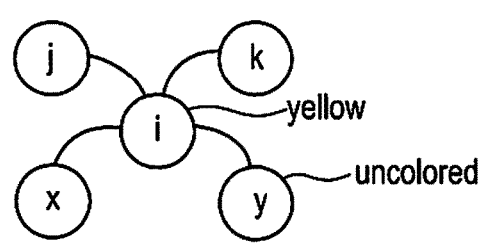
Figure 16C:
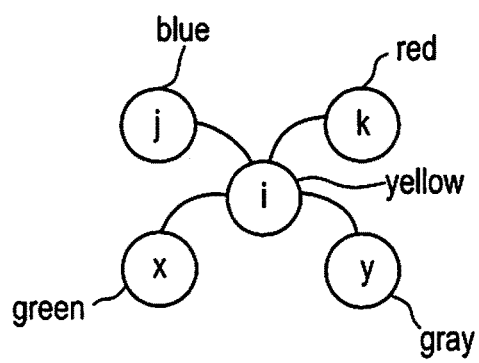

FIG. 16A represents a scenario where all adjacent vertices j, k, x, and y are uncolored. The set of existing colors in the graph (i.e., V_1 in FIG. 15) is empty. In this case, the network element 151 selects a new color 'c' (i.e., yellow) in operation 6452 and assigns the color yellow to vertex i. The set of existing colors V_1 is updated to include the color yellow, FIG. 16B illustrates another scenario in which the set of existing colors V_1 already includes the color yellow (and also blue). Here, since none of vertices j, k, x, and y are colored with yellow, the network element 151 performs operation 6402 by assigning yellow (or even blue because the other vertices are still uncolored) to vertex i.

FIG. 1.6C shows a scenario where the set of existing colors V_1 includes the colors already assigned to vertices linked to vertex i. In this case, the network element 151 performs operations 6452 and 6502 to select a new color 'c' (i.e., yellow) and update the set of existing colors V_1 to include the color yellow.

Figure 16D:
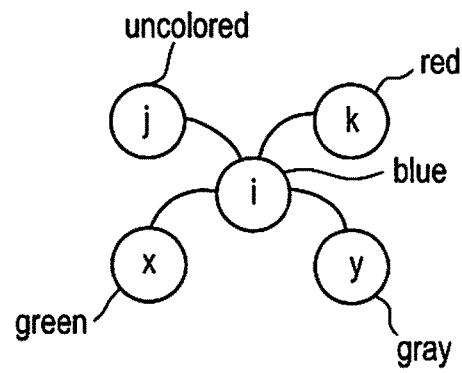

FIG. 16D shows a scenario where the network element 151 assigns the color blue to vertex 'i' because none of the vertices linked to vertex 'i' have the color blue and because the color blue is already in the existing set of colors V_1.

It should be understood that the operations described above allow for improved performance of the network because example embodiments allow for the ability to cache more packets of the more popular files at destination devices 200, increase (or alternatively, maximize) the amount of distinct packets of each file collectively cached by the destination devices 200, and allow coded multicast transmissions within a full set of requested packets of the data files. Furthermore, by combining requested packets prior to transmission it should be understood that delivery methods and/or devices according to at least one example embodiment may reduce the number of transmissions of the network element 151 which may reduce consumption and improve network efficiency.

Figure 17:
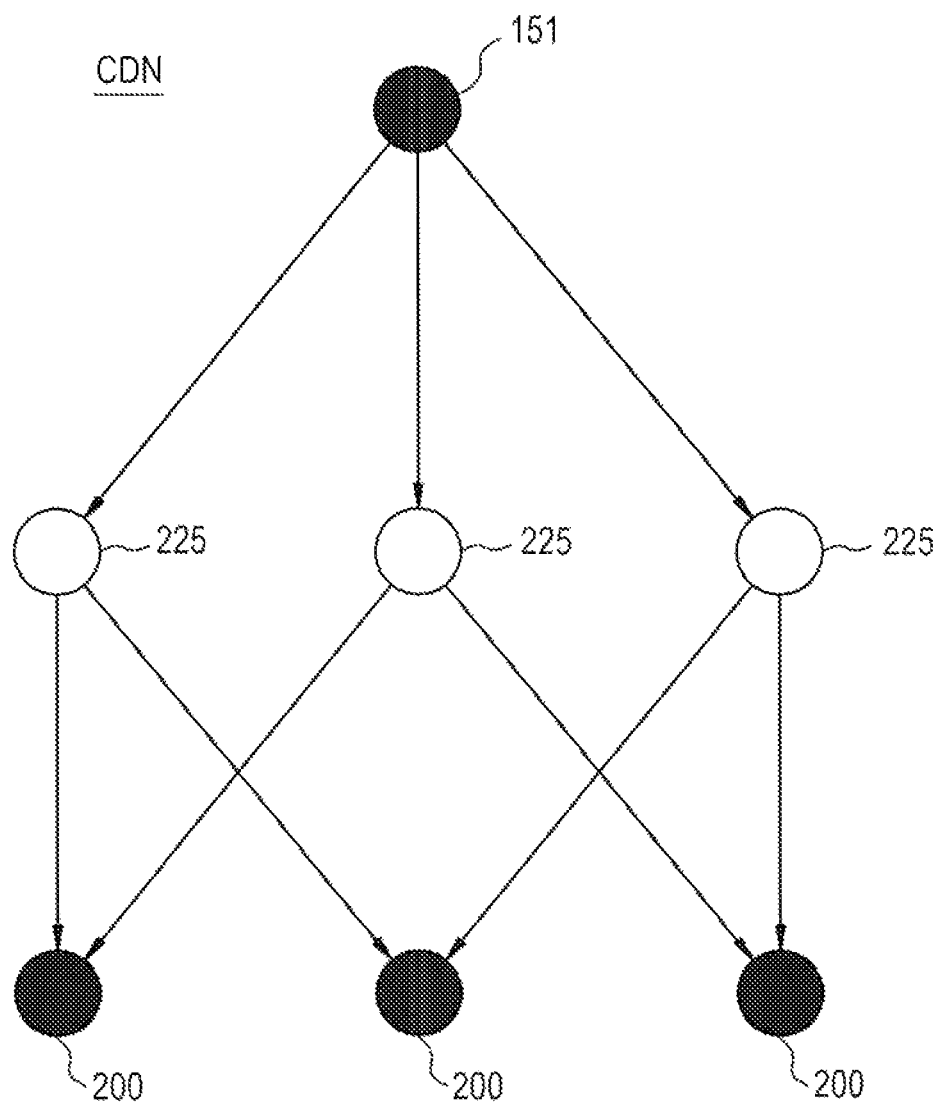
FIG. 17 illustrates a content distribution network according to at least one example embodiment.

FIG. 17 illustrates a content distribution network according to at least one example embodiment.

For example, FIG. 17 may be a type of content distribution network referred to as combination network including the network element 151, the destination devices 200, and intermediate network elements (or intermediate nodes or relay nodes) 225. The network element 151 and destination devices 200 may have the same or similar structure as the same numbered elements from FIG. 1. The intermediate nodes 225 may serve as routers between the network element 151 and destination devices 200 and have well known router hardware and/or software. The combination network may be a wired and/or wireless network with wired and/or wired connections between the network element 151, intermediate nodes 225 and destination devices 200, According to at least one example embodiment, each destination device 200 is connected to a distinct subset of intermediate nodes 225 (i.e., no two destination devices 200 are connected to the same set of intermediate nodes 225), FIG. 17 illustrates an example where each destination device 200 has two incoming connections from two different intermediate nodes 225, ft should be understood that FIGS. 18-19 are discussed as if the caching operations of FIGS. 3A and 3B have already been carried out so that each destination device 200 has cached packets of data files.

Figure 18:
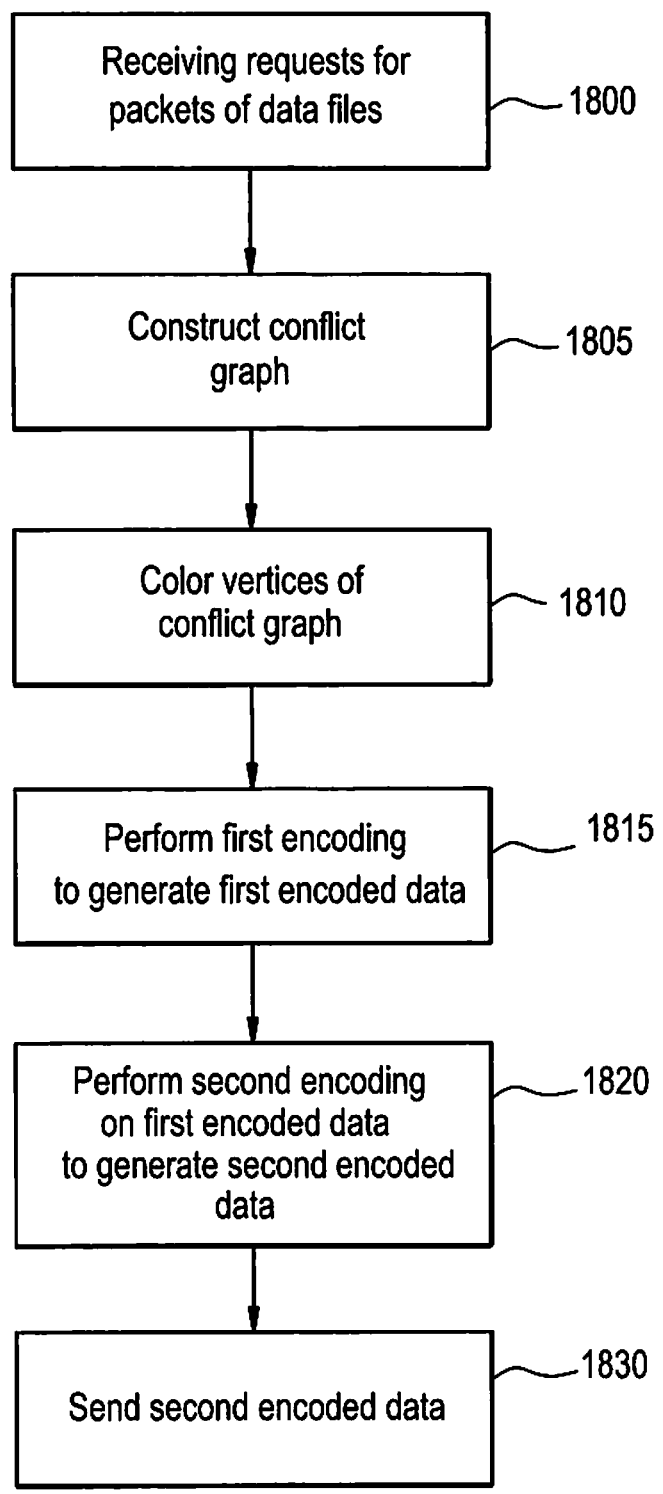
FIG. 18 illustrates example operations for a delivery phase according to at least one example embodiment.
Figure 19:
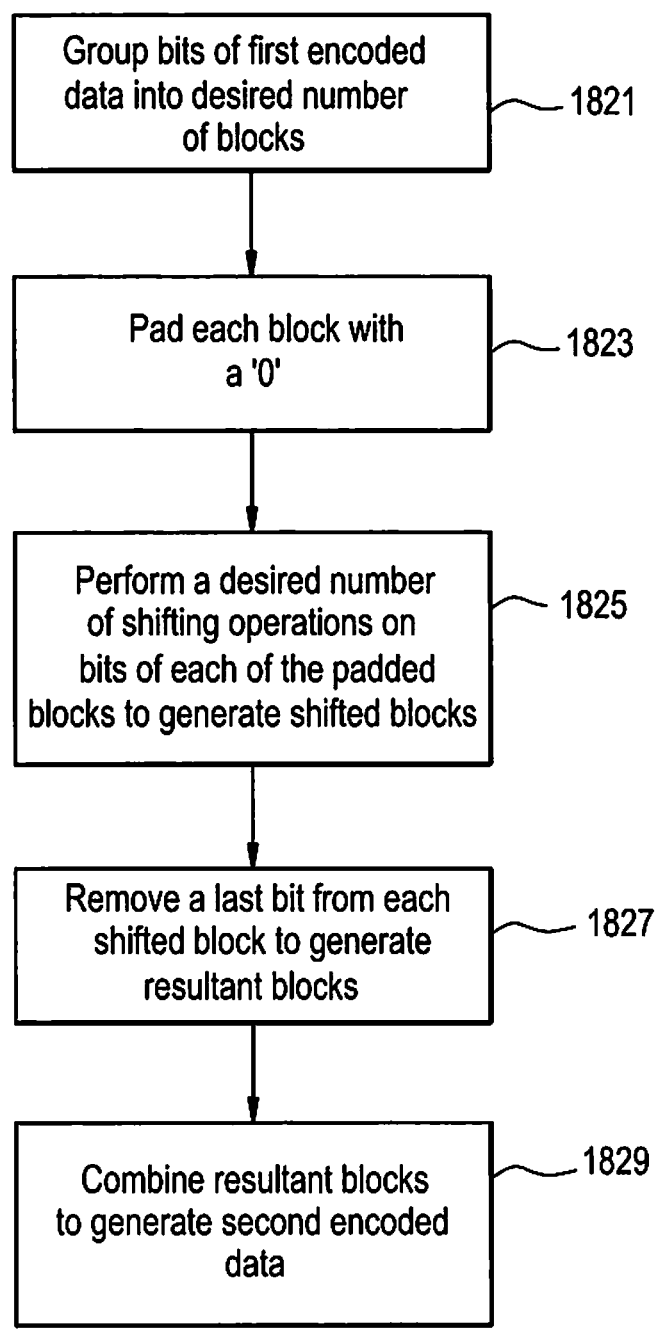
FIG. 19 illustrates example operations for an encoding method according to at least one example embodiment.

FIG. 18 illustrates example operations for a delivery phase according to at least one example embodiment.

According to at least one example embodiment, the operations shown in FIG. 18 correspond to operations performed by network element 151. In operation 1800, network element 151 receives requests from destination devices 200 for packets of data files. At least some of the requested packets have already been stored at the destination devices 200 according to the caching operations of FIGS. 3A and 3B, for example. In operation 1805, the network element 151 constructs a conflict graph. For example, the network element 151 may construct a conflict graph such that each packet requested by each destination device 200 is represented by a distinct vertex in a plurality of vertices of the conflict graph. For example, the network element 151 may construct a conflict graph according to the operations of one of FIGS. 5 and 6 based on whether a directed or undirected conflict graph is desired. From the above description of FIGS. 4-16D, it should be understood that the selection of a directed or undirected conflict graph is based on an anticipated coloring scheme, and that the anticipated coloring scheme may be user selected and/or selected based on empirical evidence (e.g., network parameters such as network type, number of destination devices, etc.) upon receiving the requests in operation 1800.

In operation 1810, the network element 151 colors vertices of the conflict graph according to the above selected coloring scheme. It should be understood that the coloring scheme may be any one of the coloring schemes described in FIGS. 4-16D above (e.g., one of the schemes referred to as a chromatic number scheme, local chromatic number scheme, GCC, HgC, and GRASP).

In operation 1815, the network element 151 may perform a first encoding operation on the requested packets using the above described coloring scheme to generate first encoded data. For example, the network element 151 performs the first encoding operation by combining packets represented by vertices having a same color to generate the first encoded data. The packets may be combined in the same or similar manner as described above with respect to FIGS. 4-16D.

In operation 1820, the network element 151 may perform a second encoding operation on the first encoded data to generate second encoded data (which will be sent over the combination network so that the first encoded data are received by all destination devices 200). For example, the network element 151 may perform the second encoding operation by combining bits of the first encoded data according to a binary encoding method. The binary encoding method is described in more detail below with respect to FIG. 19, In operation 1830, the network element 151 may send the second encoded data. For example, the network element may send the second data to destination devices 200 via intermediate nodes 225. It should be understood that the first encoding operation reduces a total load on the network, while the second encoding operation distributes the total load evenly over links (or connections) of the network.

It should be understood that although example embodiments of the first encoding operation have been described in terms of the above discussed coloring schemes, example embodiments are not limited thereto. It should be understood other encoding techniques may be employed such that operations 1805 to 1815 may be removed, substituted for, or augmented so long as operation 1820 involves encoding already encoded data. For example, operations 1805 and 1815 may be removed or replaced with other operations such that the network element 151 performs the first encoding operation on the requested packets to compress the requested packets into first encoded data (recall that a similar "compression" of packets occurs according to the combining operations described with respect to FIGS. 4-16D because packets having a same color are combined, which reduces the number of transmissions).

FIG. 19 illustrates example operations for an encoding method according to at least one example embodiment.

For example, FIG. 19 illustrates operations of the second encoding (or binary encoding method) referred to in operation 1820 above. In operation 1821, the network element 151 groups bits of the first encoded data into a desired number of blocks (or sequences). Here, the network element 151 may select the desired number of blocks based on a number of links (or connections) from intermediate nodes 225 incoming to each of the destination devices 200. For example, FIG. 17 illustrates that each destination device 200 has two incoming links from intermediate nodes 225. Thus, in this case, the network element 151 groups the bits of the first encoded data into two blocks (or sequences). According to at least one example embodiment, the network element 151 groups bits such that an equal number of bits are in each block (or sequence), If for example, the number of bits in the first encoded data does not allow for an equal number of bits in each block, then the network element 151 may add bits to one or more of the blocks using a padding technique (e.g., zero-padding technique) until blocks of equal size are formed.

In operation 1823, the network element 151 pads each of the blocks with a '0'. For example, the network element 151 adds a '0' to the end of the bits in each block. It should be understood that the '0' added in operation 1823 is in addition to any bits added by a padding technique performed in operation 1821.

In operation 1825, the network element 151 performs a desired number of shifting operations on bits of each of the padded blocks to generate shifted blocks. For example, the network element 151 selects the desired number of shifting operations for each of the padded blocks based on a number of links (or connections) from intermediate nodes 225 incoming to the destination devices 200 and a number of the intermediate nodes 225. Operations 1825 will be discussed in more detail below with respect to a specific example implementation of the second encoding operation.

In operation 1827, the network element 151 removes a last bit from each of the shifted blocks to generate resultant blocks. In operation 1829, the network element 151 combines the resultant blocks to generate the second encoded data. For example, the network element 151 performs a modulo sum or other linear combination operations on the bits in each block. Operation 1829 will be discussed in more detail below with respect to a specific example implementation of the second encoding operation.

It should be understood that the second encoding operation may vary from the operations 1821-1829 described above. For example, the second encoding operation may be any network coding operation capable of distributing (e.g., evenly distributing) the first encoded data over links of the combination network in FIG. 17.

For further clarification, the above described operations 1821-1830 will now be discussed in terms of a specific example. For this example, assume that a combination network includes network element 151 (e.g., a content source), three intermediate nodes 225, and multiple destination devices 200 (as in FIG. 17). The network element 151 is connected to the three intermediate nodes 225, and each destination device 200 is connected to a distinct subset (of cardinality two) of the three intermediate nodes 225 by two links or connections there are two links or connections to each destination device 200 as in FIG. 17). Further assume that each destination device 200 has already undergone the caching operations described with reference to FIGS. 3A-3B such that each destination device 200 contains cached packets of data files. Further still, assume that the first encoding operation in operation 1815 produces five bits B1, B2, B3, B4, and B5 (recall that the first encoding operation may relate to the coloring schemes and encoding methods described above with respect to FIGS. 4-16D).

Assuming the above conditions, in operation 1821, the network element 151 groups the bits B1 to B5 into two blocks, M1 and M2 (because there are two links to each destination device 200), where block M1 includes bits B1, B2, and B3 and block M2 includes bits B4 and B5. Because the blocks M1 and M2 do not contain an equal number of bits, the network element 151 pads block M2 with a '0' such that block M2 now includes bits B4. B5, and 0 (referred hereafter as bit B6).

In operation 1823, each block M1 and M2 is padded with a '0' to generate padded blocks L1 and L2, where padded block L1 includes bits B1, B2, B3, 0 and padded block L2 includes bits B4, B5, B6, and 0. For each of the padded blocks, the network element 151 performs a desired number of shifting operations in operation 1825.

In general, if the number of padded blocks from operation 1823 are considered as padded blocks L1, where i=1 . . . r (where 'r' is the number of incoming connections to each destination device 200; in this example r=2) and the number of intermediate nodes 225 connected to the destination devices 200 is 'k' (here k=3), then in operation 1825, the network element 151 generates a set of 'k' shifted blocks for each padded block L1. Here, to generate the shifted blocks, the network element 151 cyclically shifts bits of each padded block L1 (e.g., shifts bits to the right) by (i−1)*(j−1) bits, where i=1 . . . r; and j=1 . . . k.

In the present example involving padded blocks L1 and L2 belonging to set Li and three intermediate nodes 225 (i.e., k=3), the network element 151 creates two sets of three shifted blocks (six total shifted blocks), one set of shifted blocks being represented by CL11 CL12, and CL13 and the other set of shifted blocks being represented by CL21, CL22, and CL23, There are two sets of shifted blocks (one set for each padded block L1 and L3) because there are two incoming links (or connections) to each destination device 200 and there are three shifted blocks in each set because there are three intermediate nodes 225 connected to the destination devices 200. The number of positions to shift the bits in each set of shifted blocks is obtained by (i−1)*(j−1), where i=1, 2; and j=1, 2, 3.

Based on the above, the first set of shifted blocks CL11, CL12, and CL13 corresponding to padded block L1 are not shifted at all from padded block L1 because i=1 for padded block L1 such that (1−1)*(j−1)=0, even when j=1, 2, 3. Accordingly, shifted blocks CL11, CL12, and CL13 all have the same order of bits as padded block L1 such that each of shifted blocks CL11, CL12, and CL13=(B1, B2, B3, 0). Thus, in this description, it should be understood that the term "shifted blocks" is not limited to padded blocks with bits that have been actually shifted, and may refer to padded blocks on which the network element 151 has applied the (i−1)*(j−1) operation without resulting in shifting bits.

The second set of shifted blocks corresponding to padded block L2, however, will have different shifts for each block CL21, CL22, and CL23. For example; shifted block CL21= (B4, B5, B6, 0) (i.e., same order of bits as padded block L2 because for i=2 and j=1, the number of shifts is (2−1)*(1−1)=0). The number of positions for shifting bits in shifted block CL22 is equal to (2−1)*(2−1)=1. Accordingly, the bits in shifted block CL22 are shifted one position each from their original positions in padded block L2. For example, shifted block CL22=(0, B4, B5, B6). The number of positions for shifted block CL23 is equal to (2−1)(3−1)=2. Thus, the bits in shifted block CL23 are shifted two positions from their original positions in padded block L2. For example, shifted block CL23=(B6, B5, B4, 0).

In operation 1827, the network element 151 removes the last bit (e.g., right most) from each of shifted blocks CL11, CL12, CL13, CL21, CL22, and CL23 to generate resultant blocks T11, T12, T13, T21, T22, and T23, respectively. Here, T11=(B1, B2, B3), T12=(B1, B2, B3), T13=(B1, B2, B3), T21=(B4, B5, B6), T22=(0, B4, B5), and T23=(B6, B5, B4).

In operation 1829, the network element 151 combines the resultant blocks to generate the second encoded data, represented by encoded data ED1, ED2, and ED3. For example, encoded data EDT may be a modulo sum of T11 and T21, encoded data ED2 may be a modulo sum of T12 and T22, and encoded data ED3 may be a modulo sum of T13 and T23. The modular sums may be, for example, XOR operations or some other linear combination operations.

In operation 1830, the network element 151 may send encoded data ED1, ED2, and ED3 to the three intermediate nodes 225, respectively. That is, each encoded data ED1, ED2, and ED3 may be sent to a respective one of the intermediate nodes 225 (e.g., encoded data ED1 is sent to a first intermediate node 225, encoded data ED2 is sent to a second intermediate node 225, and encoded data ED3 is sent to a third intermediate node 225). The intermediate nodes 225 may route the encoded data to the user destinations 200, and the user destinations 200 may decode the encoded data using packets of data stored in their caches as a key. It should be understood that the foregoing example is not limiting and that the same concepts could be applied on any sized scale.

Based on the foregoing description, it should be understood that a content distribution network according to at least one example embodiment may reduce the number of total transmissions in the network while simultaneously distributing the load evenly across the network's connections.

Variations of the example embodiments are not to be regarded as a departure from the spirit and scope of the example embodiments. All such variations as would be apparent to one skilled in the art are intended to be included within the scope example embodiments.

It is claimed:

1. A method for transmitting data files in a combination network, comprising:
    performing a caching method including determining popularities for the data files according to a demand distribution of destination devices and sending random packets of the data files to the destination devices based on the determined popularities;
    receiving one or more requests from one or more the destination devices for packets of one or more the data files, wherein the requests are for missing packets that were not cached as a result of the caching method;
    constructing a conflict graph, such that each packet requested by each destination device is represented by a distinct vertex among a plurality of vertices of the conflict graph, based on which of the plurality of vertices represent a same requested packet and which requested packets are stored in caches belonging to the destination devices;
    coloring the plurality of vertices of the conflict graph according to a coloring scheme such that any two linked vertices have different colors;
    performing a first encoding operation on the requested packets by combining subsets of the requested packets represented by vertices having a same color to generate first encoded data;
    performing a second encoding operation on the first encoded data by combining bits of the first encoded data according to a binary encoding method to generate second encoded data, wherein the binary encoding method includes,
        determining a number of blocks based on a number of connections incoming to the destination devices from intermediate nodes, wherein the intermediate nodes connect a source of the data files to the destination devices and the destination devices are connected to different subsets of the intermediate nodes,
        grouping the bits of the first encoded data into a the determined number of blocks,
        padding one or more of the blocks with at least one bit to generate padded blocks,
        determining a number of shifting operations for the padded blocks based on (i) the number of connections incoming to the destination devices from the intermediate nodes and (ii) a total number of the intermediate nodes,
        performing the determined number of shifting operations on bits of one or more of the padded blocks to generate shifted blocks,
        removing at least one bit from the shifted blocks to generate resultant blocks, and
        combining the resultant blocks to generate the second encoded data; and
    sending respective subsets of the second encoded data towards the one or more destination devices via respective intermediate nodes, wherein
        the first encoding operation reduces a total load on the combination network, and
        the second encoding operation distributes the total load evenly over the connections incoming to the destination devices from the intermediate nodes.

2. The method of claim 1, wherein the constructing constructs an undirected conflict graph.

3. The method of claim 1, wherein the constructing constructs a directed conflict graph.

4. The method of claim 1, wherein the binary encoding method includes,
    grouping the bits of the first encoded data into the number of blocks having an equal number of bits in at least some of the blocks,
    padding the one or more blocks with at least one '0' to generate the padded blocks,
    performing the determined number of shifting operations on the bits of the one or more padded blocks to generate the shifted blocks,
    removing a last bit from the shifted blocks to generate the resultant blocks, and
    combining the resultant blocks to generate the second encoded data.

5. The method of claim 1, wherein the performing the caching method further includes
    ranking the data files based on the determined popularities,
    dividing the ranked data files into a first subset of data files and a second subset of data files based on a threshold value, the first subset including higher ranked data files than the second subset,
    selecting a respective number of random packets for each data file of the first subset according to a respective rank, and
    sending the selected random packets to the destination devices such that each destination device caches different random packets for each data file of the first subset.

6. A device for transmitting data files in a combination network, comprising:
    a memory including instructions stored thereon; and
    a processor configured to execute the instructions stored on the memory to,
        perform a caching method including determining popularities for the data files according to a demand distribution of destination devices and sending random packets of the data files to the destination devices based on the determined popularities,
        receive one or more requests from the destination devices for packets of the data files, wherein the requests are for missing packets that were not cached as a result of the caching method;
        construct a conflict graph, such that each packet requested by each destination device is represented by a distinct vertex among a plurality of vertices of the conflict graph, based on which of the plurality of vertices represent a same requested packet and which requested packets are stored in caches belonging to the destination devices,
        color the plurality of vertices of the conflict graph according to a coloring scheme such that any two linked vertices have different colors,
        perform a first encoding operation on the requested packets by combining subsets of the requested packets represented by vertices having a same color to generate first encoded data, and perform a second encoding operation on the first encoded data by combining bits of the first encoded data according to a binary encoding method to generate second encoded data, wherein the binary encoding method includes, determining a number of blocks based on a number of connections incoming to the destination devices from intermediate nodes, wherein the intermediate nodes connect a source of the data files to the destination devices and the destination devices are connected to different subsets of the intermediate nodes, grouping the bits of the first encoded data into the determined number of blocks, padding one or more of the blocks with at least one bit to generate padded blocks, determining a number of shifting operations for the padded blocks based on (i) the number of connections incoming to the destination devices from the intermediate nodes and (ii) a total number of the intermediate nodes, performing the determined number of shifting operations on bits of one or more of the padded blocks to generate shifted blocks, removing at least one bit from one or more of the shifted blocks to generate resultant blocks, and combining the resultant blocks to generate the second encoded data, and sending respective subsets of the second encoded data towards the destination devices via respective intermediate nodes, wherein the first encoding operation reduces a total load on the combination network, and the second encoding operation distributes the total load evenly over the connections incoming to the destination devices from the intermediate nodes.

7. The device of claim 6, wherein the processor is configured to execute the instructions stored on the memory to construct the conflict graph as an undirected conflict graph.

8. The device of claim 6, wherein the processor is configured to execute the instructions stored on the memory to construct the conflict graph as a directed conflict graph.

9. The device of claim 6, wherein the processor is configured to execute the instructions stored on the memory to perform the binary encoding method by, grouping the bits of the first encoded data into the number of blocks having an equal number of bits in at least some of the blocks, padding the one or more blocks with at least one '0' to generate the padded blocks, performing the determined number of shifting operations on the bits of the one or more padded blocks to generate the shifted blocks, removing a last bit from the shifted blocks to generate the resultant blocks, and combining the resultant blocks to generate the second encoded data.

10. The device of claim 6, wherein the processor is configured to execute the instructions stored on the memory to perform the caching method further including ranking the data files based on the determined popularities, dividing the ranked data files into a first subset of data files and a second subset of data files based on a threshold value, the first subset including higher ranked data files than the second subset, selecting a respective number of random packets for each data file of the first subset according to a respective rank, and sending the selected random packets to the destination devices such that each destination device caches different random packets for each data file of the first subset.

* * * * *